US011009100B2

(12) United States Patent
Godsey

(10) Patent No.: US 11,009,100 B2
(45) Date of Patent: May 18, 2021

(54) HELICAL BELT ASSEMBLY, METHOD OF USE, AND KIT THEREFORE

(71) Applicant: Gregory A. Godsey, Waco, TX (US)

(72) Inventor: Gregory A. Godsey, Waco, TX (US)

( * ) Notice: Subject to any disclaimer, the term of this patent is extended or adjusted under 35 U.S.C. 154(b) by 0 days.

(21) Appl. No.: 16/699,519

(22) Filed: Nov. 29, 2019

(65) Prior Publication Data

US 2020/0173522 A1 Jun. 4, 2020

Related U.S. Application Data

(60) Provisional application No. 62/773,578, filed on Nov. 30, 2018.

(51) Int. Cl.
*F16G 1/28* (2006.01)
*F16G 7/04* (2006.01)
(Continued)

(52) U.S. Cl.
CPC .......... *F16G 1/28* (2013.01); *F16G 3/02* (2013.01); *F16G 3/12* (2013.01); *F16G 5/20* (2013.01);
(Continued)

(58) Field of Classification Search
CPC ..... F16G 1/00; F16G 1/02; F16G 1/04; F16G 1/06; F16G 1/08; F16G 1/10; F16G 1/12; F16G 1/28; F16G 5/00; F16G 5/02; F16G 5/04; F16G 5/06; F16G 5/08; F16G 5/10; F16G 5/20; F16G 3/02; F16G 3/04; F16G 3/06; F16G 3/08; F16G 3/09; F16G 3/12; F16G 3/14; F16G 7/00; F16G 7/02;
(Continued)

(56) References Cited

U.S. PATENT DOCUMENTS 3,744,095 A 7/1973 Tomlinson
3,922,759 A * 12/1975 Mabie .................. F16G 3/00
24/31 B
(Continued)

OTHER PUBLICATIONS

Gear—Wikipedia: https://en/wikipedia.org/wiki/Gear, Sep. 30, 2019—14 pages.
(Continued)

*Primary Examiner* — Michael R Mansen
*Assistant Examiner* — Raveen J Dias
(74) *Attorney, Agent, or Firm* — Lapple Ubell IP Law, LLP; Matthew C. Lapple

(57) ABSTRACT

Disclosed herein is an assembly, method of assembling, and kit for assembling an assembled flexible helical belt that is mounted within a mounting space defined by a continuous mechanical constraint of a device. Embodiments of the flexible helical belt include a flexible helical belt that has a plurality of belt teeth, where some of the belt teeth are each pierced by a through hole which extends through the respective belt tooth and where the flexible helical belt is of sufficient length such that, when the flexible helical belt is mounted within the intended mounting space, the flexible helical belt overlaps itself by at least one rotation such that each through hole is transversely aligned with at least one other through hole, enabling a transverse compression device to be fitted through the through holes, creating a transverse compressive force on the flexible helical belt to form a single continuous drive belt.

85 Claims, 14 Drawing Sheets

(51) Int. Cl.
*F16G 3/02* (2006.01)
*F16G 5/20* (2006.01)
*F16G 7/02* (2006.01)
*F16G 3/12* (2006.01)
*B29D 29/08* (2006.01)
*F16H 7/02* (2006.01)

(52) U.S. Cl.
CPC ............... *F16G 7/02* (2013.01); *F16G 7/04* (2013.01); *F16H 7/023* (2013.01); *B29D 29/08* (2013.01)

(58) Field of Classification Search
CPC ......... F16G 7/04; B29D 29/08; B29D 29/085; B29D 29/00; B29D 29/06; B29D 29/10; B29D 29/103; B29D 29/106
USPC .................................................. 474/204, 205
See application file for complete search history.

(56) References Cited

U.S. PATENT DOCUMENTS

| | | | |
|---|---|---|---|
| 4,298,343 A | 11/1981 | Redmond, Jr. | |
| 4,541,823 A | 9/1985 | Marsh et al. | |
| 4,642,081 A | 2/1987 | Balomenos | |
| 4,705,495 A | 11/1987 | Madion | |
| 4,846,770 A * | 7/1989 | Lane | F16G 3/00 474/253 |
| 5,092,823 A * | 3/1992 | Longo | F16G 1/00 474/253 |
| 8,136,827 B2 | 3/2012 | Lumpkin | |
| 9,091,324 B2 | 7/2015 | Pasch | |
| 10,088,020 B2 | 10/2018 | Cody | |
| 2003/0013568 A1 | 1/2003 | Rivin | |
| 2004/0115413 A1* | 6/2004 | Lofgren | F16G 5/20 428/297.4 |
| 2011/0111901 A1* | 5/2011 | Chiang | F16G 1/28 474/205 |
| 2011/0168529 A1 | 7/2011 | Vincenzi et al. | |
| 2013/0062168 A1* | 3/2013 | Frey | F16G 1/28 198/844.2 |
| 2015/0345588 A1* | 12/2015 | Frey | B65G 15/36 198/844.2 |
| 2018/0010667 A1* | 1/2018 | Wu | F16G 3/04 |

OTHER PUBLICATIONS

Split Belt Pro Belt Drive—Veer: https://www.veercycle.com/collections/all/products/split-belt-pro?variant=29894666125390, Nov. 7, 2019—10 pages.

International Search Report and Written Opinion mailed by ISA/US PCT Office in the corresponding PCT patent application No. PCT/US2019/063885 dated Feb. 18, 2020—9 pages.

* cited by examiner

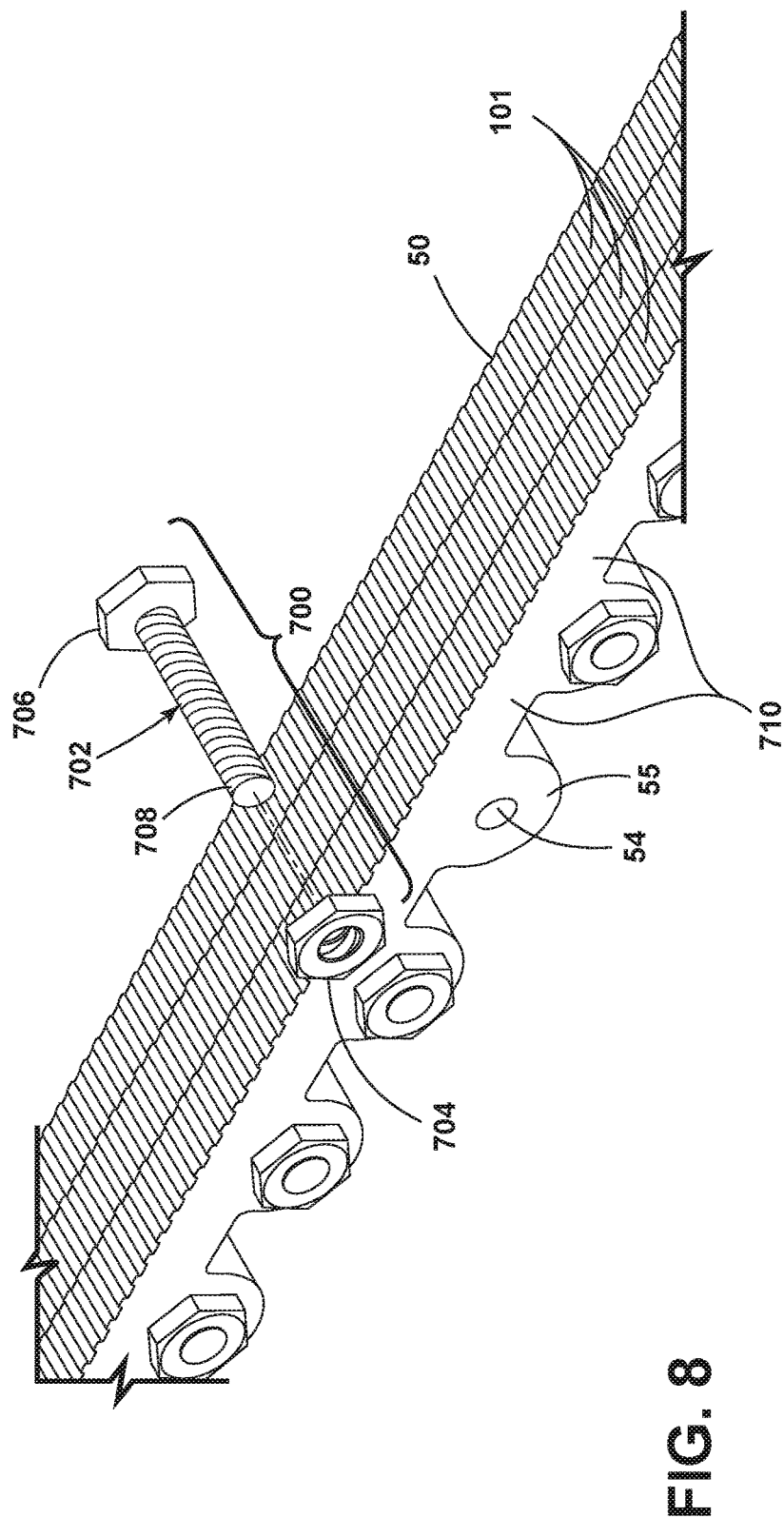
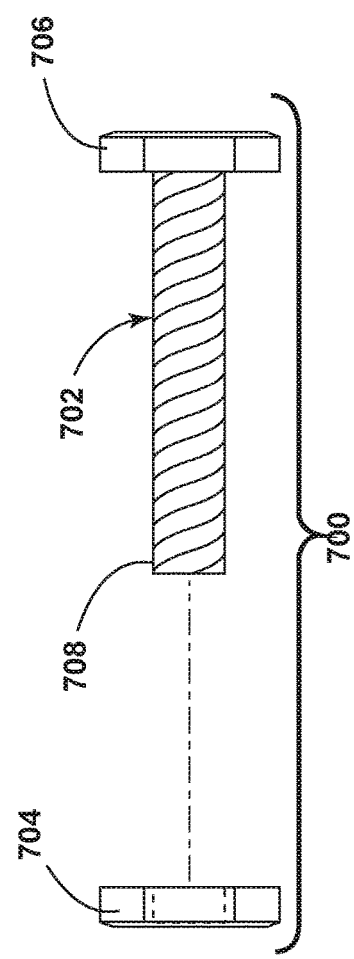
FIG. 8
FIG. 9

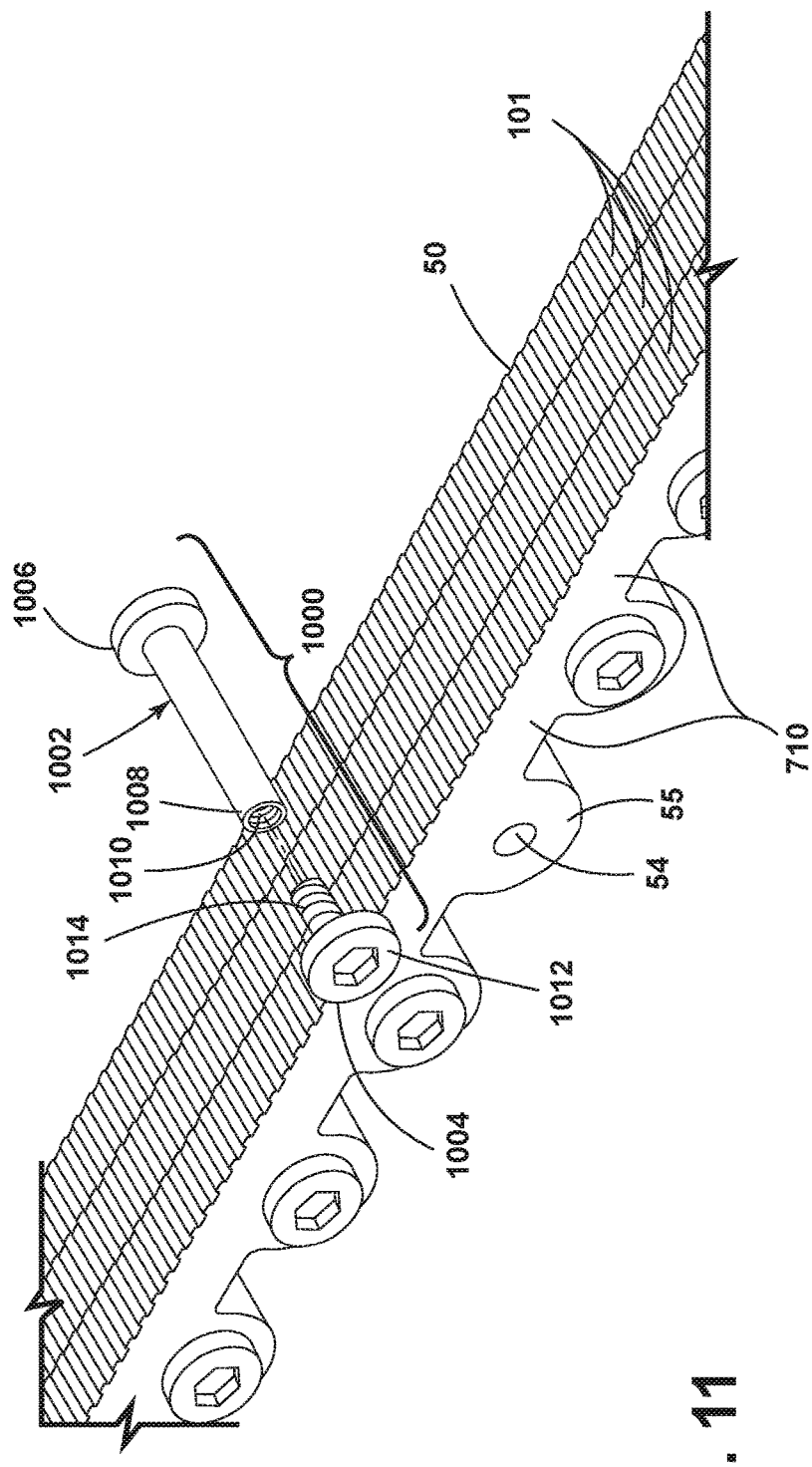
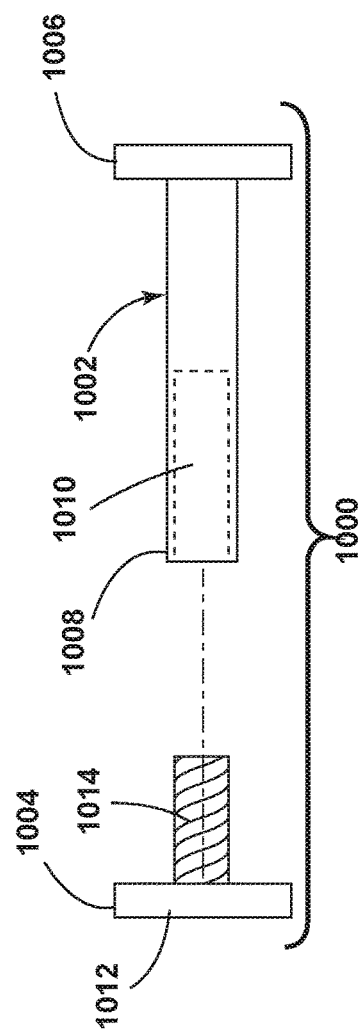
FIG. 11
FIG. 12

HELICAL BELT ASSEMBLY, METHOD OF USE, AND KIT THEREFORE

TECHNICAL FIELD

The present invention is generally directed to a belt drive system that can be used in connection with machines that have a structural constraint that prevents mounting a continuous, unending belt on sprockets, pulleys, or other machine components that are situated wholly or partially within the bounds of a structural constraint. One example of such a structural constraint is what is generally known as a "confined tube."

BACKGROUND

Conventional drive trains for certain vehicles and other machines have been comprised of a drive chain providing power between a first sprocket (also sometimes referred to as a "sprocket wheel" or "pulley") and a similar, though sometimes different diameter, second sprocket. The drive chain of the conventional arrangement is formed from a multiplicity of interconnected metal links with openings at their centers such that the teeth that are circumferentially arranged around the perimeter of the first sprocket and the teeth that are circumferentially arranged around the perimeter of the second sprocket engage and fit into the openings within the links of the drive chain as the drive chain passes around the sprockets and the sprockets are rotated. Application of a torqueing force that causes the first sprocket to rotate will be transmitted from the rotating first sprocket to the second sprocket by the drive chain. The operation of such a conventional drive train utilizing a drive chain and two sprockets to transmit a torqueing force from one sprocket to another sprocket is well understood in the prior art.

More recently, various belt drive systems have been used as an alternative to the conventional drive trains and their metal drive chains. These belt drive systems use a continuous, unending drive belt that includes a plurality of longitudinally spaced belt teeth (sometimes referred to as lugs) located on the inner surface of the drive belt that are engaged by a multiplicity of lateral teeth that are circumferentially arranged on the outer perimeter of a first sprocket and on a corresponding second sprocket. U.S. Pat. No. 8,136,827 to Lumpkin and U.S. Pat. No. 10,088,020 to Cody disclose two such belt drive systems. The prior art belt drive systems such as those described by the patents to Lumpkin and Cody share in common the use of a continuous, endless belt that is made of a continuous, single piece of rubber or single piece of polymeric material, or a continuous, single composite material structure rather than the interconnected metal links of the traditional metal drive chain. The continuous nature of a drive belt means that it is not designed to be separated and later reconnected in the same manner as a metal chain that is comprised of interconnected links. In other words, the drive belt of a belt drive system is continuous and there are no separable links or separable portions that provide for intentional separation and reconnection.

Belt drive systems have a number of advantages over conventional drive train arrangements that make use of metal chains. However, one disadvantage of using a belt drive system rather than a conventional drive train with a metal chain is encountered when a user attempts to mount the drive belt onto two sprockets of a machine in which one of the sprockets is physically located within, or partially located within, a structural constraint having no openings along its perimeter through which the body of a continuous drive belt may pass, and where the other sprocket is located on the outside of that same structural constraint. In order to mount the continuous drive belt onto both sprockets in such a system, the user is forced to either make a mechanical opening through the structural constraint so that the body of the continuous drive belt can be passed through that opening and then mounted onto the sprocket that is located within the boundaries of the constraint, or the user must cut through the drive belt itself such that it is no longer endless or continuous and so that a newly-created end of the drive belt can be threaded into the space bounded by the structural constraint where a sprocket is located for mounting to that sprocket, followed by the ends of the belt being reconnected in some manner. Frequently neither of these alternatives for mounting a drive belt is desirable because creating a mechanical opening in the structural constraint of the machine may weaken or negatively compromise the overall strength and structural integrity of the machine, while cutting the drive belt ruins or severely compromises the integrity and mechanical properties of the drive belt because it destroys the endless, continuous nature of the materials from which the drive belt is made.

This challenge is exacerbated when the user is faced with what is known as a structural constraint generally known as a "confined tube." In such a situation, the drive train must extend through a narrow opening and run through either an intentionally placed tube structure (such as a personnel finger guard), or through a confined space that approximates a tube shape, which is created by adjacent structural and mechanical elements. In such confined tube situations, a continuous drive belt is normally unable to be used, because it is extremely difficult—or even impossible—to install. Herein, when Applicant refers to a "mounting space defined by a continuous mechanical constraint," this phrase refers to both the confined tube situation, as well as any other situation in which a belt must be mounted onto two sprockets of a machine in which one of the sprockets is physically located within, or partially located within, a structural constraint having no openings along its perimeter through which the body of a continuous drive belt may pass, and where the other sprocket is located on the outside of that same structural constraint.

Certain segmented, spliced, or wrapped belt systems are known in the prior art, specifically U.S. Pat. No. 4,541,823 to Marsh ("Marsh"), U.S. Pat. No. 3,744,095 to Tomlinson ("Tomlinson") and a commercially available "split belt" from Veer Cycle. Each has drawbacks and disadvantages, including weakness in the splice, poor strength and/or reliability due to shear load placed on pins or the splice, an inability to detach, customize or modify in the field due to permanent fixation of the pins by melting, gluing, or the use of barbed couplings that cut into the belt material, and the inability of each of these prior art devices to provide relief from the shear forces that are applied to a limited number of coupling pins, resulting in possible failure of the pins or belt near the pins.

What is needed is a way to mount an endless, continuous, flexible drive belt onto the sprockets of a machine in which one of the sprockets is physically located within the boundaries of a structural constraint without mechanically altering either the structural constraint or separating the endless, continuous drive belt in a manner that destroys or negatively impacts its physical integrity or mechanical properties. Further, what is needed is an endless, continuous, flexible drive belt that is constructed in such a way as to avoid placing undue shear forces on a belt splice or any small number of pins or connectors.

SUMMARY OF DISCLOSED EMBODIMENTS

The various embodiments of the present helical belt assembly has several features, no single one of which is solely responsible for its desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments solve the problems discussed in the Background and provide the advantages described herein.

In a first aspect, an assembled helical belt that is mounted within a mounting space defined by a continuous mechanical constraint of a device wherein the assembled helical belt includes a flexible helical belt having two distinct ends that is further comprised of a plurality of belt teeth affixed on a first planar surface of the helical belt, where at least a subset of the plurality of belt teeth of the flexible helical belt are each pierced by a through hole which extends through the respective belt tooth and where the flexible helical belt is of sufficient length such that, when the flexible helical belt is mounted within the intended mounting space, the flexible helical belt overlaps itself by at least one rotation such that each of the plurality of through holes are transversely aligned with at least one other through hole, and a plurality of transverse compression devices, each of which is fitted through one of the plurality of through holes of the belt teeth, and further through the at least one transversely aligned through hole, wherein each respective transverse compression device creates a compressive force on the flexible helical belt in a direction that is generally transverse to the length of the flexible helical belt, such that the assembled, compressed, flexible helical belt forms a single, continuous, unending drive belt that passes through the mounting space.

In an embodiment of the first aspect, least one of the plurality of transverse compression devices includes an externally threaded bolt with a head and further with a shaft of a maximum diameter sufficient to pass through the through holes, an internally threaded nut of an internal diameter sufficient to engage the threads of the externally threaded bolt, and where the internally threaded nut is engaged to the externally threaded bolt such that the nut and the head create the compressive force.

In another embodiment of the first aspect, the externally threaded bolt is has a hexagonal head.

In another embodiment of the first aspect, the externally threaded bolt has a head with an Allan key depression.

In another embodiment of the first aspect, at least one of the plurality of transverse compression devices includes a pin comprising a pin head and a shaft, wherein the shaft comprises a smooth exterior sleeve of a diameter sufficient to pass through the through holes, where the smooth exterior sleeve further comprises an interior longitudinal channel, a securing bolt comprising a bolt head and an exterior threaded shaft of sufficient diameter such that the exterior threaded shaft of the securing bolt can threadably engage the interior longitudinal channel of the smooth exterior sleeve of the pin, and where the securing bolt exterior threaded shaft is engaged with the interior longitudinal channel such that the bolt head and the pin head create the compressive force.

In another embodiment of the first aspect, the exterior threaded shaft of the securing bolt is further secured to the interior longitudinal channel by a threadlocking adhesive.

In another embodiment of the first aspect, at least one of the plurality of transverse compression devices includes a headed barbed pin having a head and a shaft, wherein the distal end of the shaft has at least one barb, a cap nut which is a nut with a at least one internal non-threaded annular grooves or indentations configured for engaging with the at least one barb of the headed barbed pin, so as to snap the cap nut onto the distal end of the headed barbed pin, and where the cap nut is engaged to the at least one barb such that the cap nut and the head create the compressive force.

In another embodiment of the first aspect, the shaft and the at least one barb are of diameter and length that when engaged in a through hole to compress the flexible helical belt in a transverse direction, the at least one barb does not cut or otherwise put pressure on the flexible helical belt in the longitudinal direction of the length of the flexible helical belt.

In another embodiment of the first aspect, the headed barbed pin is made of metal.

In another embodiment of the first aspect, the headed barbed pin is made of plastic, such as nylon, polyethylene terephthalate ("PET"), polypropylene, polyvinyl chloride ("PVC") or any other moderately stiff plastic.

In another embodiment of the first aspect, at least one of the plurality of transverse compression devices comprises a staple clip having a transverse arm from which extends, on either side of the transverse arm, a pair of compression arms, where each of the compression arms is biased inwardly, and further where each of the compression arms has an opposed detent configured to engage with a through hole, such that when the clip is engaged with the aligned through holes, each opposed detent is engaged to a through hole on one side of the flexible helical belt and the compression arm delivers the transverse compressive force to the flexible helical belt via the opposed detents engaged at the aligned through holes.

In another embodiment of the first aspect, at least one of the plurality of transverse compression devices comprises a lacing solution, which has a lace that is laced through aligned through holes and further wrapped around the exterior planar side of the flexible helical belt, and then further laced through an adjacent set of aligned though holes, where the lace is tightened such that the lace delivers the transverse compressive force to the flexible helical belt.

In another embodiment of the first aspect, the lace is made of Kevlar.

In another embodiment of the first aspect, the lace is made of metal links.

In another embodiment of the first aspect, the lace is made of metal wire.

In another embodiment of the first aspect, at least one of the plurality of transverse compression devices includes a lacing solution, which has a lace that is laced through aligned through holes and which is in contact with an outside edge of the flexible helical belt but not the exterior planar side of the flexible helical belt, so that when the lace is tightened the lace delivers the transverse compressive force to the flexible helical belt.

In another embodiment of the first aspect, there is a through hole in every other belt tooth.

In another embodiment of the first aspect, there is a through hole in every third belt tooth.

In another embodiment of the first aspect, the flexible helical belt has at least one embedded strand of Kevlar fiber.

In another embodiment of the first aspect, the flexible helical belt has at least one embedded strand of carbon fiber.

In another embodiment of the first aspect, the flexible helical belt has at least one embedded strand of nylon fiber.

In another embodiment of the first aspect, the flexible helical belt has at least one embedded strand of metal wire.

In another embodiment of the first aspect, the belt is assembled without melting or gluing the flexible helical belt to itself.

In another embodiment of the first aspect, the belt is assembled without any barbed couplings directly engaging the flexible helical belt.

In another embodiment of the first aspect, the flexible helical belt has a width, and the assembled helical belt has the flexible helical belt looped upon itself such that at least three widths of the flexible helical belt are adjacent to one another for the entire length of the assembled helical belt.

In another embodiment of the first aspect, the flexible helical belt has a width of between 8 cm and 1000 cm, and any sub-set range within this defined range.

In another embodiment of the first aspect, the transverse compression device can be removed without damaging the flexible helical belt.

In another embodiment of the first aspect, the flexible helical belt has grooves on a second planar surface of the flexible helical belt, for engagement with a belt tensioner.

In another embodiment of the first aspect, the transverse compressive force applied by at least one of the transverse compression devices is at least 3 pounds per square inch.

In a second aspect, a method for mounting a helical belt assembly within a mounting space defined by a continuous mechanical constraint of a device is provided, and the method includes selecting a flexible helical belt having two distinct ends that is further comprised of a plurality of belt teeth affixed on a first planar surface of the helical belt and wherein a plurality of the belt teeth of the flexible helical belt are each pierced by a through hole which extends through the respective belt tooth and wherein the flexible helical belt is of sufficient length such that, when the flexible helical belt is mounted within the intended mounting space, the flexible helical belt overlaps itself by at least one rotation such that each of the plurality of through holes will be transversely aligned with at least one other through hole, selecting a plurality of transverse compression devices, each of which may be fitted through one of the plurality of through holes of the belt teeth, and further through the at least one transversely aligned through hole, and engaging the plurality of transverse compression devices with the flexible helical belt, such that each respective transverse compression device, when engaged with the respective through hole and the respective transversely aligned through hole, creates a compressive force on the flexible helical belt in a direction that is generally transverse to the length of the flexible helical belt, such that the compressed flexible helical belt forms a single, continuous, unending drive belt that passes through the mounting space.

In an embodiment of the second aspect, at least one of the plurality of transverse compression devices includes an externally threaded bolt with a head and further with a shaft of a maximum diameter sufficient to pass through the through holes, an internally threaded nut of an internal diameter sufficient to engage the threads of the externally threaded bolt, and where the internally threaded nut is engaged to the externally threaded bolt such that the nut and the head create the compressive force.

In another embodiment of the second aspect, the externally threaded bolt has a hexagonal head.

In another embodiment of the second aspect, the externally threaded bolt has a head with an Allan key depression.

In another embodiment of the second aspect, at least one of the plurality of transverse compression devices includes a pin comprising a pin head and a shaft, where the shaft comprises a smooth exterior sleeve of a diameter sufficient to pass through the through holes, where the smooth exterior sleeve further comprises an interior longitudinal channel, and a securing bolt comprising a bolt head and an exterior threaded shaft of sufficient diameter such that the exterior threaded shaft of the securing bolt can threadably engage the interior longitudinal channel of the smooth exterior sleeve of the pin, and where the securing bolt exterior threaded shaft is engaged with the interior longitudinal channel such that the bolt head and the pin head create the compressive force.

In another embodiment of the second aspect, the exterior threaded shaft of the securing bolt is further secured to the interior longitudinal channel by a threadlocking adhesive.

In another embodiment of the second aspect, the at least one of the plurality of transverse compression devices includes a headed barbed pin comprising a head and a shaft, where the distal end of the shaft comprises at least one barb, a cap nut which is a nut with at least one internal non-threaded annular groove or indentation configured for engaging with the at least one barb of the headed barbed pin, so as to snap the cap nut onto the distal end of the headed barbed pin, and where the cap nut is engaged to the at least one barb such that the cap nut and the head create the compressive force.

In another embodiment of the second aspect, the shaft and the at least one barb are of diameter and length that when engaged in a through hole to compress the flexible helical belt in a transverse direction, the at least one barb does not cut or otherwise put pressure on the flexible helical belt in the longitudinal direction of the length of the flexible helical belt.

In another embodiment of the second aspect, the headed barbed pin is comprised of metal.

In another embodiment of the second aspect, the headed barbed pin is comprised of plastic.

In another embodiment of the second aspect, at least one of the plurality of transverse compression devices is a staple clip including a transverse arm from which extend, on either side of the transverse arm, a compression arm, wherein each of the compression arms is biased inwardly, and further wherein each of the compression arms has an opposed detent configured to engage with a through hole, such that when the clip is engaged with the aligned through holes, each opposed detent is engaged to a through hole on one side of the flexible helical belt and the compression arm delivers transverse compressive force to the flexible helical belt via the opposed detents engaged at the aligned through holes.

In another embodiment of the second aspect, at least one of the plurality of transverse compression devices comprises a lacing solution including a lace that is laced through aligned through holes and further wrapped around the exterior planar side of the flexible helical belt, and then further laced through an adjacent set of aligned though holes, and where the lace is tightened such that the lace applies the transverse compressive force to the flexible helical belt.

In another embodiment of the second aspect, the lace is comprised of Kevlar.

In another embodiment of the second aspect, least one of the plurality of transverse compression devices comprises a lacing solution including a lace that is laced through aligned through holes and which is in contact with an outside edge of the flexible helical belt but not the exterior planar side of the flexible helical belt, where the lace is tightened such that the lace applies the transverse compressive force to the flexible helical belt.

In another embodiment of the second aspect, there is a through hole in every other belt tooth.

In another embodiment of the second aspect, there is a through hole in every third belt tooth.

In another embodiment of the second aspect, the flexible helical belt has at least one embedded strand of Kevlar fiber.

In another embodiment of the second aspect, the flexible helical belt has at least one embedded strand of carbon fiber.

In another embodiment of the second aspect, the flexible helical belt has at least one embedded strand of nylon fiber.

In another embodiment of the second aspect, the flexible helical belt has further comprised of at least one embedded strand of metal wire.

In another embodiment of the second aspect, the belt is assembled without melting or gluing the flexible helical belt to itself.

In another embodiment of the second aspect, the belt is assembled without any barbed couplings directly engaging the flexible helical belt.

In another embodiment of the second aspect, the flexible helical belt has a width, and the assembled helical belt has the flexible helical belt looped upon itself such that at least three widths of the flexible helical belt are adjacent to one another for the entire length of the assembled helical belt.

In another embodiment of the second aspect, the flexible helical belt has a width of between 8 cm and 1000 cm.

In another embodiment of the second aspect, the transverse compression device can be removed without damaging the flexible helical belt.

In another embodiment of the second aspect, the flexible helical belt has grooves on a second planar surface of the flexible helical belt, for engagement with a belt tensioner.

In a third aspect, a kit of components is provided for making a helical belt assembly that may be mounted within a mounting space defined by a continuous mechanical constraint of a device, and the kit includes a flexible helical belt having two distinct ends that is further comprised of a plurality of belt teeth affixed on a first planar surface of the helical belt, where a plurality of the belt teeth of the flexible helical belt are each pierced by a through hole which extends through the respective belt tooth, where the flexible helical belt is of sufficient length such that, when the flexible helical belt is mounted within the intended mounting space, the flexible helical belt will overlap itself by at least one rotation such that each of the plurality of through holes will be transversely aligned with at least one other through hole, and a plurality of transverse compression devices, each of which may be fitted through one of the plurality of through holes of the belt teeth, and further through the at least one transversely aligned through hole, where each respective transverse compression device, when engaged with the respective through hole and the respective transversely aligned through hole, will create a compressive force on the flexible helical belt in a direction that is generally transverse to the length of the flexible helical belt.

In an embodiment of the third aspect, at least one of the plurality of transverse compression devices includes an externally threaded bolt with a shaft of a maximum diameter sufficient to pass through the through holes and an internally threaded nut of an internal diameter sufficient to engage the threads of the externally threaded bolt.

In another embodiment of the third aspect, the externally threaded bolt has a hexagonal head.

In another embodiment of the third aspect, the externally threaded bolt has a head with an Allan key depression.

In another embodiment of the third aspect, at least one of the plurality of transverse compression devices includes a pin with a head and a shaft, where the shaft comprises a smooth exterior sleeve of a diameter sufficient to pass through the through holes, where the smooth exterior sleeve further comprises an interior longitudinal channel and a securing bolt comprising a head and an exterior threaded shaft of sufficient diameter such that the exterior threaded shaft of the securing bolt can threadably engage the interior longitudinal channel of the smooth exterior sleeve of the pin.

In another embodiment of the third aspect, the exterior threaded shaft of the securing bolt is further secured to the interior longitudinal channel by a threadlocking adhesive.

In another embodiment of the third aspect, at least one of the plurality of transverse compression devices includes a headed barbed pin comprising a head and a shaft, where the distal end of the shaft comprises at least one barb, and a cap nut which is a nut with a at least one internal non-threaded annular groove, or an indentation, configured for engaging with the at least one barb of the headed barbed pin, so as to snap the cap nut onto the distal end of the headed barbed pin.

In another embodiment of the third aspect, the shaft and the at least one barb are of diameter and length that when engaged in a through hole to compress the flexible helical belt in a transverse direction, the at least one barb does not cut or otherwise put pressure on the flexible helical belt in the longitudinal direction of the length of the flexible helical belt.

In another embodiment of the third aspect, the headed barbed pin is made of metal.

In another embodiment of the third aspect, the headed barbed pin is made of plastic.

In another embodiment of the third aspect, at least one of the plurality of transverse compression devices includes a staple clip having a transverse arm from which extend, on either side of the transverse arm, a compression arm, wherein each of the compression arms is biased inwardly, and further wherein each of the compression arms has an opposed detent configured to engage with a through hole, such that when the clip is engaged with the aligned through holes, each opposed detent is engaged to a through hole on one side of the flexible helical belt and the compression arm delivers transverse compressive force to the flexible helical belt via the opposed detents engaged at the aligned through holes.

In another embodiment of the third aspect, at least one of the plurality of transverse compression devices includes a lacing solution including a lace that is laced through aligned through holes and further wrapped around the exterior planar side of the flexible helical belt, and then further laced through an adjacent set of aligned though holes, where the lace is tightened such that the lace applies the transverse compressive force to the flexible helical belt.

In another embodiment of the third aspect, the lace is comprised of Kevlar.

In another embodiment of the third aspect, least one of the plurality of transverse compression devices includes a lacing solution that has a lace that is laced through aligned through holes and which is in contact with an outside edge of the flexible helical belt but not the exterior planar side of the flexible helical belt, where the lace is tightened such that the lace applies the transverse compressive force to the flexible helical belt.

In another embodiment of the third aspect, there is a through hole in every other belt tooth.

In another embodiment of the third aspect, there is a through hole in every third belt tooth.

In another embodiment of the third aspect, the flexible helical belt is has at least one embedded strand of Kevlar fiber.

In another embodiment of the third aspect, the flexible helical belt has at least one embedded strand of carbon fiber.

In another embodiment of the third aspect, the flexible helical belt has at least one embedded strand of nylon fiber.

In another embodiment of the third aspect, the flexible helical belt has at least one embedded strand of metal wire.

In another embodiment of the third aspect, the belt is assembled without melting or gluing the flexible helical belt to itself.

In another embodiment of the third aspect, the belt is assembled without any barbed couplings directly engaging the flexible helical belt.

In another embodiment of the third aspect, the flexible helical belt has a width, and the assembled helical belt has the flexible helical belt looped upon itself such that at least three widths of the flexible helical belt are adjacent to one another for the entire length of the assembled helical belt.

In another embodiment of the third aspect, the flexible helical belt has a width of between 8 cm and 1000 cm.

In another embodiment of the third aspect, the transverse compression device can be removed without damaging the flexible helical belt.

In another embodiment of the third aspect, the flexible helical belt has grooves on a second planar surface of the flexible helical belt, for engagement with a belt tensioner.

In a fourth aspect, an assembled helical belt that is mounted within a mounting space defined by a continuous mechanical constraint of a device wherein the assembled helical belt includes a flexible helical belt having two distinct ends that is further comprised of a plurality of belt teeth affixed on a first planar surface of the helical belt, where at least a subset of the plurality of belt teeth of the flexible helical belt each have a belt tooth indentation on a first side of the respective belt tooth, and where the flexible helical belt is of sufficient length such that, when the flexible helical belt is mounted within the intended mounting space, the flexible helical belt overlaps itself by at least one rotation such that each of the belt tooth indentations are transversely aligned with at least one other belt tooth indentation, and a plurality of transverse compression clips, each of which is fitted to engage one of the plurality of belt tooth indentations, wherein each respective transverse compression clip creates a compressive force on the flexible helical belt in a direction that is generally transverse to the length of the flexible helical belt, such that the assembled, compressed, flexible helical belt forms a single, continuous, unending drive belt that passes through the mounting space.

Further, certain embodiments disclosed herein include a continuous, endless helical belt assembly that may be formed from a single, continuous, but not endless, helical belt that may be wrapped in a helix pattern multiple times around two sprockets of a machine in which one of the sprockets is located within, or partially within, a bounded space defined by a structural constraint that has no openings on its outer perimeter, and the other sprocket is located outside of the outer perimeter of the structural constraint. The helical belt will be wrapped around the outer perimeter of the two sprockets and back and forth between the two sprockets in a helical manner so as to connect the two sprockets in a manner similar but distinct from the drive belt of the known belt drive systems discussed in the patents referenced above. The helical belt will be wrapped around the outer perimeter of each sprocket such that some of the belt teeth provided on the interior surface of the helical belt will toothedly engage with a majority of the teeth that are circumferentially provided on the outer perimeter of each of the sprockets.

Initial assembly of the belt drive assembly involves engagingly wrapping the helical belt around the outer perimeter of a first sprocket, threading an end of the helical belt into the space bounded by the structural constraint where the belt is engagingly wrapped around the outer perimeter of the second sprocket located in that space, passing the end of the helical belt back around the outer perimeter of the structural constraint and back to the first sprocket where this wrapping sequence involving wrapping of the helical belt around the sprockets and through and around the space defined by the structural constraint will be repeated in the same manner at least once, and preferably two or more times, to form multiple loops of the helical belt. This helical wrapping of the helical belt over the two sprockets with the intermediate steps of threading an end of the helical belt into and subsequently around the outer perimeter of the structural constraint is made possible because the helical belt has two distinct ends prior to final assembly of the belt drive assembly, and also because the width of the helical belt is less than the width of the two sprockets' laterally positioned teeth. The helical belt also includes a multiplicity of evenly spaced belt teeth that protrude from the interior side of the belt loops that are wrapped around the two sprockets such that the belt teeth of the multiple loops and the lateral teeth of the sprockets will engage each other in a manner similar to what has been previously described for belt drive systems.

Each of the belt teeth of the helical belt is provided with a through hole that passes laterally through the width of the belt teeth and is of a diameter to fit a compression pin that may be inserted through the through holes of the belt teeth and secured by a retainer clip when assembling the helical belt assembly. When the helical belt is helically wrapped around the two sprockets and intermediately through and around the outer perimeter of the structural constraint several times to form multiple loops in which the belt teeth of the helical belt are engaged with the majority of sprockets' teeth and the majority, preferably the entirety, of the width of the sprockets' laterally positioned teeth are thereby toothedly engaged with the belt teeth, then the loops of the helical belt can be brought together and aligned at their edges and secured together using a multiplicity of compression pins that are inserted through a multiplicity of the through holes of the belt teeth and then secured in place by retainer clips to complete the assembly of the helical belt assembly. It can be appreciated that the multiple loops of the helical belt will normally need to be positioned and pulled taut around the two outer perimeters of the two sprockets such that the through holes within the belt teeth of each loop of the helical belt will be concentrically aligned with through holes of belt teeth on at least one and preferably two adjacent loops of the helical belt and such that each of the belt teeth will be paired with at least one belt tooth of an adjacent belt loop, though it is preferable that at least three belt teeth, each a member of a separate helical loop, will be aligned with each other with their through holes concentrically aligned. In this manner, the multiplicity of compression pins can then be inserted through a multiplicity of the concentrically positioned through holes in the belt teeth of multiple loops and then pinned in place using retainer clips so as to firmly draw the multiple belt loops together and to complete the helical belt assembly on the sprockets such that it now can serve as an endless, continuous drive belt. A more complete understanding of the helical belt assembly and methods for its assembly on a machine having a structural constraint may be obtained with reference to the attached drawing figures and the descriptions provided below for each.

BRIEF DESCRIPTION OF THE DRAWINGS

In the descriptions that follow, like parts or steps are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 8 is a close-up, perspective, back side, assembly drawing illustrating the threaded bolt embodiment of the transverse compression device of FIG. 7;

FIG. 9 is a close-up side view assembly drawing illustrating the threaded bolt and accompanying nut of FIG. 7;

FIG. 11 is a close-up, perspective, back side, assembly drawing illustrating a smooth sleeve pin embodiment of the transverse compression device of FIG. 10;

FIG. 12 is a close-up side view assembly drawing illustrating the smooth sleeve pin bolt and accompanying securing bolt of FIG. 10;

DETAILED DESCRIPTION OF THE EMBODIMENTS

The present embodiments disclose and describe an assembled continuous, flexible, helical drive belt, a method of assembling the drive belt, and a kit of components to assemble the drive belt. The embodiments disclosed herein are intended to be instructional and not limiting to the scope of the claims, except where specifically set forth.

Figures 1, 2:
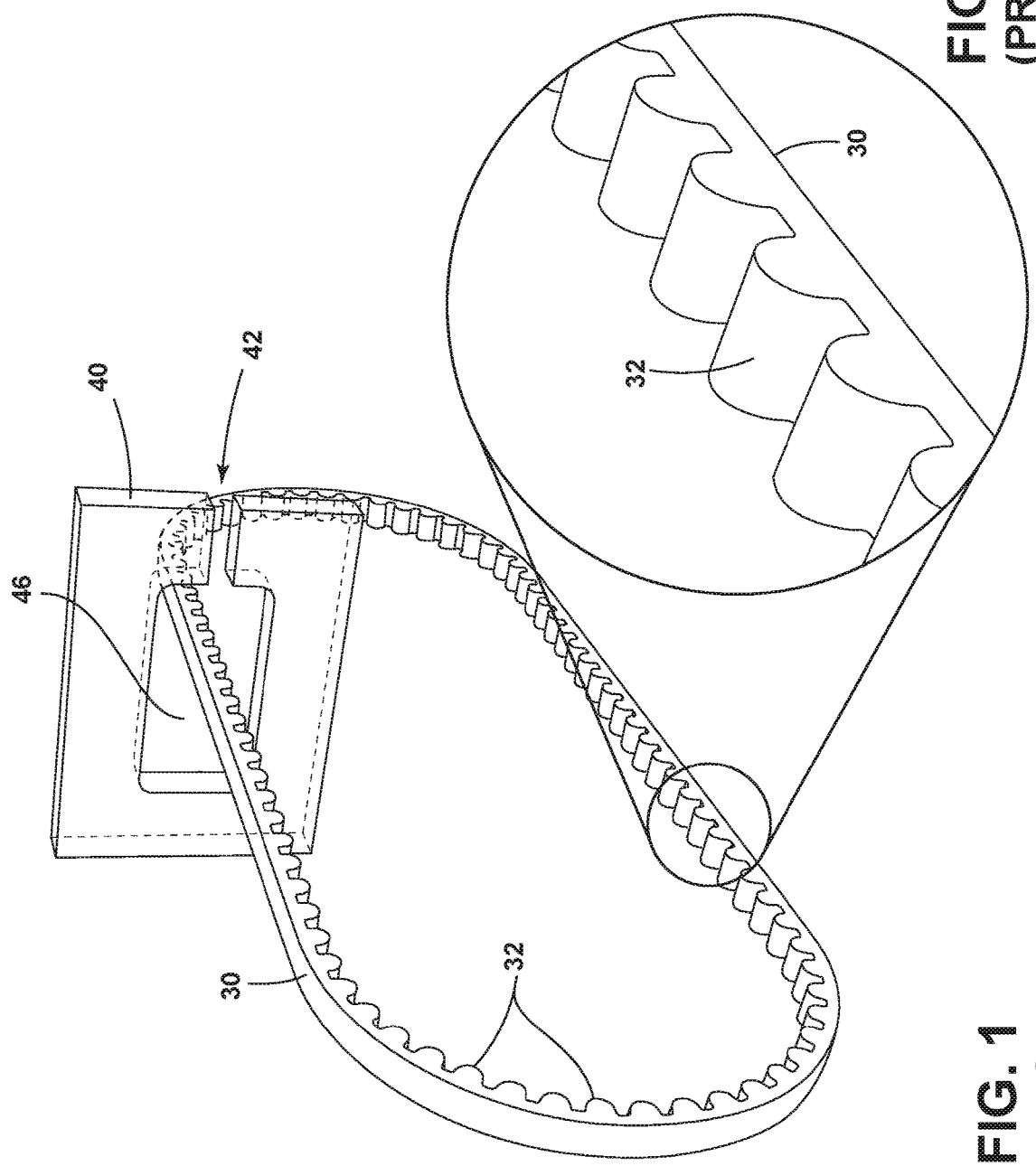
FIG. 1 (PRIOR ART) schematically illustrates a perspective view of the prior art, namely a conventional continuous flexible toothed belt used in conjunction with a system that has a constraint with an opening that allows use of a continuous belt.
FIG. 2 (PRIOR ART) illustrates an enlarged section of the prior art belt of FIG. 1.

FIG. 1 and FIG. 2 illustrate how the difficulty with mounting a prior art endless, continuous drive belt 30 onto a machine with a structural constraint 40 has previously been overcome in the prior art. As shown in FIG. 1, where drive belt 30 has been used in situations where there is a structural constraint 40 of a machine preventing the drive belt 30 from being mounted onto or within the machine, one prior art solution is to simply cut a physical opening 42 through the structural constraint 40 and then use that physical opening 42 to slip the body of the drive belt 30 through the opening 42 into the mounting space 46 defined by the structural constraint 40 where drive belt 30 can be mounted to other components of the machine, such as a sprocket (not shown). In other words, a continuous, unending, flexible drive belt 30 of the prior art including a multiplicity of belt teeth 32 that are located on its inner surface is simply passed through the physical opening 42 that is cut through the structural constraint 40 of the machine so that the drive belt 30 may be mounted to a component (not shown) located inside the mounting space 46 that is defined by the structural constraint 40. While cutting a physical opening 42 in a structural constraint 40 solves the problem of positioning the drive belt 32 inside the mounting space 46 without cutting or mechanically separating the continuous drive belt 32, the physical opening 42 cut through the structural constraint 40 is a physical alteration to the machine that may be significantly harmful to the structural integrity and mechanical strength of the overall machine.

Figure 3:
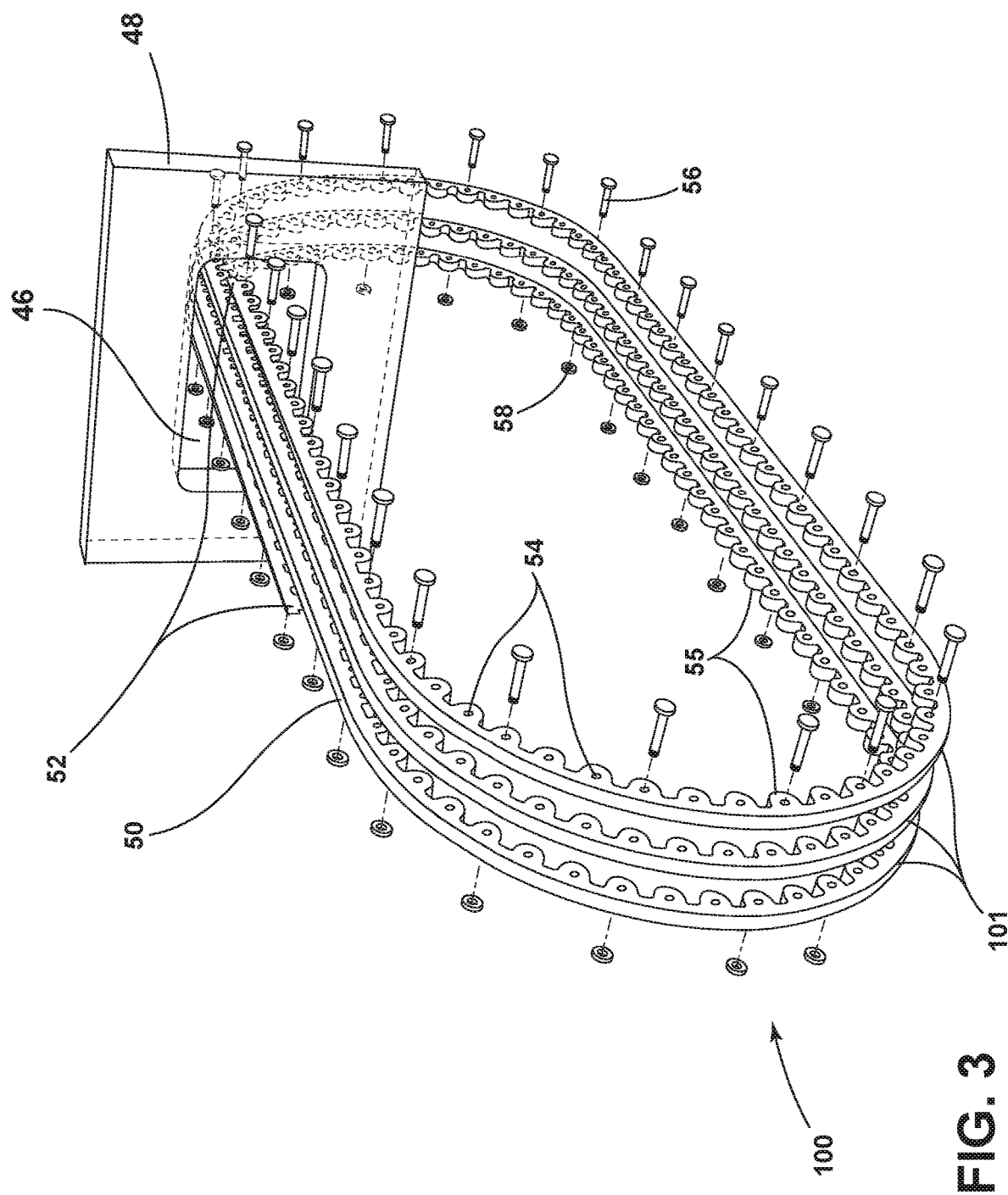
FIG. 3 schematically illustrates an exploded perspective view of an embodiment of the helical belt assembly disclosed herein, installed in a constrained location that otherwise prevents use of a conventional continuous belt.

FIG. 3 is an exploded perspective view of an embodiment of the helical belt assembly 100 that is disclosed by this application. FIG. 3 illustrates the helical belt assembly 100 as it might appear during the mounting of the helical belt assembly 100 onto a machine that is comprised, at least in part, of a structural constraint 48 with no opening in its perimeter that defines an interior mounting space 46. As shown in FIG. 3, the helical belt assembly 100 is comprised of a flexible, continuous helical belt 50 with two ends 52 that also includes a multiplicity of belt teeth 55, each of which further includes a through hole 54 passing laterally through the body of the belt teeth 55. It will be understood that not every belt tooth 55 must have a through hole 54. In some embodiments, not shown, there is a through hole 54 in every other belt tooth 55, or in every third belt tooth 55. The multiplicity of belt teeth 55 are located on the inside planar surface of the helical belt 50. During mounting of the helical belt assembly 100 onto or within a machine having a structural constraint 48 wherein the helical belt 50 must be mounted to component(s) of the machine such as a sprocket (not shown) that are located within the mounting space 46 bounded by the structural constraint 48, one of the ends 52 of helical belt 50 is inserted into and passed through the mounting space 46 such that the helical belt 50 may be wrapped around a component such as a sprocket (not shown) that is located within the mounting space 46, and then the end 52 may be looped back around the outer perimeter of the structural constraint 48. An end 52 of the helical belt 50 may be passed through the mounting space 46 a desired number of times, such that multiple loops 101 of the helical belt 50 are formed as the helical belt 50 is repeatedly threaded into the mounting space 46 and wrapped back around the outer perimeter of the structural constraint 48 during the assembly process. In any event, at least one loop 101 must be made, so that every through hole 54 is adjacent to at least one other through hole 54. That said, different numbers of loops 101 may be used for different applications, so as to provide the desired tensile strength of the assembled belt 100, and so as to provide the desired width of the assembled belt, each of which are related to the sprocket(s) to which the assembled belt 100 will be engaged. In some embodiments, two loops, three loops, four loops or five loops may be beneficial. It will also be understood that the helical belt 50 may have reinforcing longitudinal fiber strands embedded in the belt, such as one or more strands of Kevlar fiber, carbon fiber, nylon fiber, or metal wire. These reinforcing strands are preferably oriented longitudinally, or near longitudinally, such that they are not cut, or are at least not cut to short lengths, during manufacture of the helical belt 50, nor by formation of the belt teeth through holes. The multiple loops 101 of the helical belt 50 are brought together so that the edges of the loops 101 abut each other and the belt teeth 55 on the multiple loops 101 are aligned, so that the through holes are aligned and then a multiplicity of transverse compression devices, in this embodiment compression pins 56, in conjunction with retainer clips 58 serve to provide transverse compression of the multiple loops 101 of the helical belt 50, i.e., compression of the belt generally in a direction that is transverse to the length of the helical belt 50.

This transverse compression serves to hold the multiple loops 101 of the helical belt 50 in fixed position with respect to one another, and thus cause the assembled belt 100 to act mechanically like a single continuous drive belt.

Further, and importantly, the transverse compression devices serve to prevent or reduce shear forces that are brought to bear on the pins and through holes of prior art "splice" type belts, and prior art "segmented" type belts that have multiple segments joined through the use of pins, and the belt of Marsh, which is either glued together, melted together, or joined by barbed couplings that cut into the belt material. In these prior art type belts, when pulling force is put upon the belt via the operation of a sprocket, a shear force is imposed upon the prior art pins and/or the portions of the prior art belts which form apertures for the prior art pins. In the Marsh belt, shear force is imposed upon the glue/melt bond lines, and/or upon the barbed coupling and surrounding belt. This shear force can cause wear and is believed to result in failure of the belt at the splice or segment bond of these prior art belts. In some cases prior art belt failure is the result of prior art pin failure, while in other prior art belt designs, failure is the result of tearing of the prior art belt at the aperture, or the glue/melt bond, caused by shear forces placed upon the pin and/or surrounding belt material. Increasing the tension load in one of these prior art systems where a non-compressive pin must resist shear loads, increases the shear forces felt by the prior art pin in a direct and linear fashion. The present embodiments avoid this failure mode, because the transverse compression devices reduce or prevent imposition of shear forces on the pins or through holes of the belt. Increasing the tension load on a system in accordance with the present disclosure, and where the transverse compression device provides a compressive force on the multiple loops of the helical belt does not increase the shear force felt by each of the transverse compressive devices until the belt or belt teeth begin to fail, making the failure mode of the presently disclosed embodiments the belt itself, as opposed to the connection (e.g., the splice or the segment connections) for the discussed prior art belts.

As will be appreciated, the amount of transverse compressive force needed to avoid imposition of shear force will vary depending upon the number of loops 101, the width of the helical belt 50, the type of transverse compression device used, whether there is proper engagement of the belt teeth with the sprocket teeth, whether there is uniform tension on the belt—or whether "slack" exits, and on the amount of pulling force that will be applied to the assembled belt 100 by a driving sprocket. In some embodiments, the transverse compressive force is approximately three (3) pounds per square inch. In other embodiments, the transverse compressive force must be at least three pounds per square inch or greater.

Returning to FIG. 3, the multiplicity of compression pins 56 are inserted through a multiplicity of the now-aligned through holes 54 of aligned belt teeth 55 and then pinned in place by a multiplicity of retainer clips 58. The compression pins 56 and the retainer clips 58 thereby cooperate to hold the multiple loops 101 together so that the helical belt assembly 100 is capable of being mounted to the machine's component(s) such as a sprocket (not shown) that is located within the mounting space 46. It should be appreciated that the helical belt assembly 100 when mounted on a machine is comprised of multiple loops 101 that are joined together by a plurality of transverse compression devices, such as the multiplicity of compression pins 56 and retainer clips 58, such that the continuity and mechanical properties of the helical belt 50 is not compromised by any mechanical separations or cuts through the continuous, flexible material of which it is made, but the now-joined loops 101 of the helical belt assembly 100 are capable of serving as a continuous, endless drive belt that can be mounted onto machine component(s), such as sprockets or pulleys, that are located within the mounting space 46 without compromising the strength or structural integrity of the structural constraint 48 or the overall machine.

Figures 4, 5:
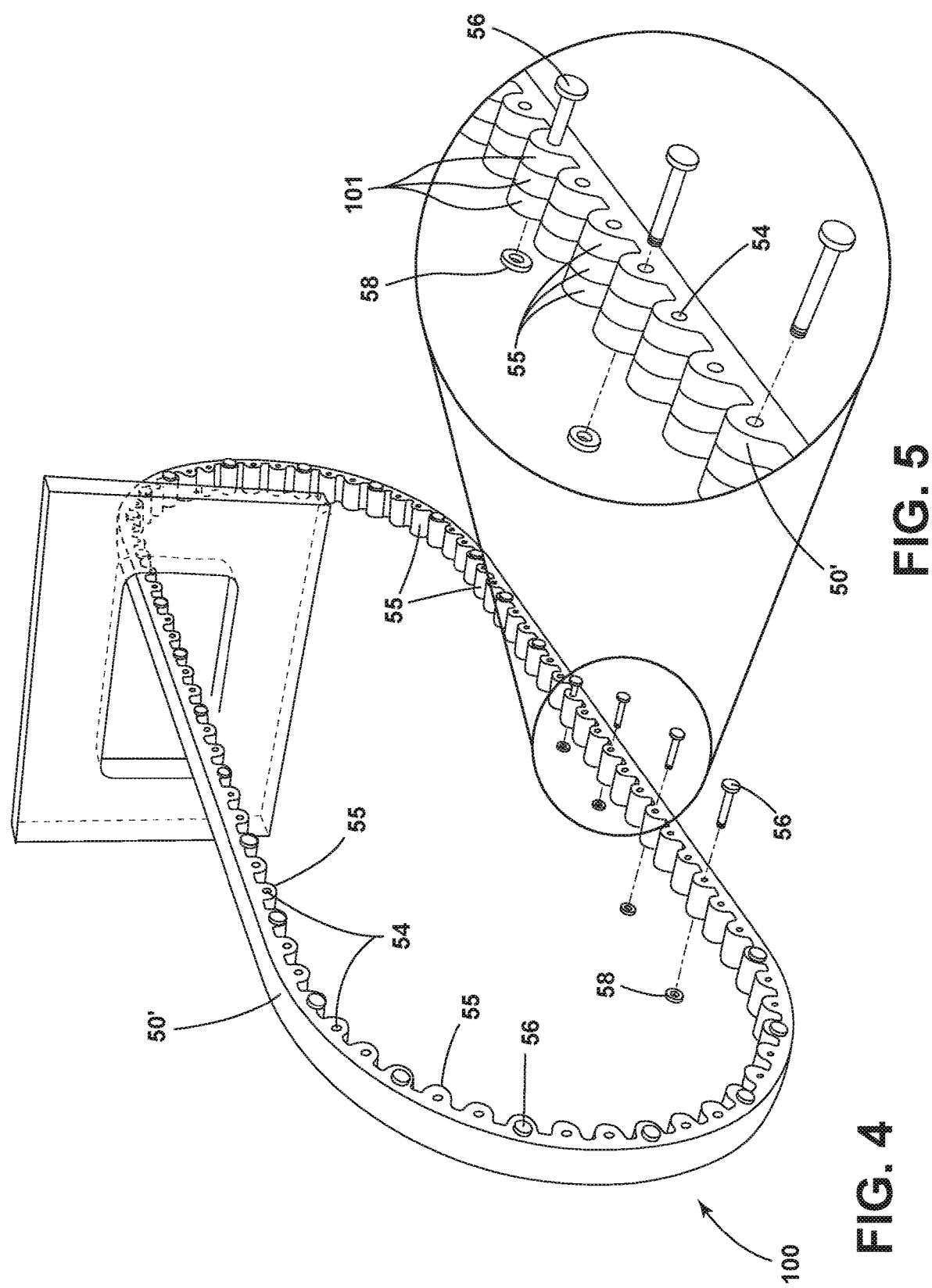
FIG. 4 schematically illustrates a perspective view of an assembled embodiment of the helical belt assembly disclosed herein, installed in a constrained location that otherwise prevents use of a conventional continuous belt.
FIG. 5 illustrates an enlarged section of the helical belt assembly of FIG. 4.

FIG. 4 is a perspective view of the helical belt assembly 100 near the end of the assembly process of mounting the helical belt assembly 100 onto a machine or device that has a structural constraint 48 with no openings through its perimeter. As shown by FIG. 4, the helical belt assembly 100 when assembled is comprised of an assembled helical belt 50' including a multiplicity of belt teeth 55 that feature through holes 54 in the belt teeth 55. The belt teeth 55 of separate loops (the loops are now mated together at their abutting edges and therefore no longer easily distinguishable) of the now assembled helical belt 50' are secured together with a multiplicity of compression pins 56 that pass through a multiplicity of concentrically aligned through holes 54 in the aligned belt teeth 55 of the aligned loops 101, with the compression pins being held in place with a multiplicity of retainer clips 58. Thus, the assembled helical belt 50' passes through the mounting space 46 defined by the structural constraint 48 and can be mounted to component(s) of the machine, such as sprockets or pulleys (not shown), that are located within the mounting space 46. FIG. 5 is a detail view of the helical belt 50 showing how its multiple loops 101 are brought into mating alignment with each other at their edges during assembly, and the compression pins 56 are inserted through the concentrically aligned through holes 54 of the aligned belt teeth 55 of the multiple loops 101 and held in place using a multiplicity of retainer clips 58.

As can be understood, the helical belt assembly disclosed herein is superior to the prior art belt drive systems because it can be mounted to a machine's sprockets or pulleys that are located within an internal space that is surrounded by structural members that have no opening in their outer perimeters and that therefore form a continuous mechanical constraint that prevents mounting of the prior art drive belts. The helical belt assembly disclosed may be mounted to such components that are located within a structural constraint without the need of mechanically opening or cutting through the machine's structural constraint and without cutting or mechanically separating the continuous drive belt in a manner that would negatively impact the drive belt's integrity or physical strength.

In an alternative embodiment of the helical belt assembly, the helical belt may be very slightly tapered from one end of the unassembled helical belt to the other end of the unassembled helical belt. Thus, the loops of the unassembled helical belt would not have straight line edges to be brought into abutment in the manner illustrated in FIG. 3 and FIG. 5, but would instead have slightly angled edges that could be brought into mating alignment and abutment with each other during assembly. The loops of the unassembled helical belt of the alternative embodiment would therefore have varying widths when examined from one loose end to the other loose end of the unassembled helical belt, but the loops of the belt would still be assembled in the manner described above with the edges of the belt loops and the belt teeth of the various loops being brought into alignment with each other and a multiplicity of compression pins and retainer clips being used to secure the belt teeth together in order to hold the multiple loops of the helical belt together during final assembly.

Figure 6:
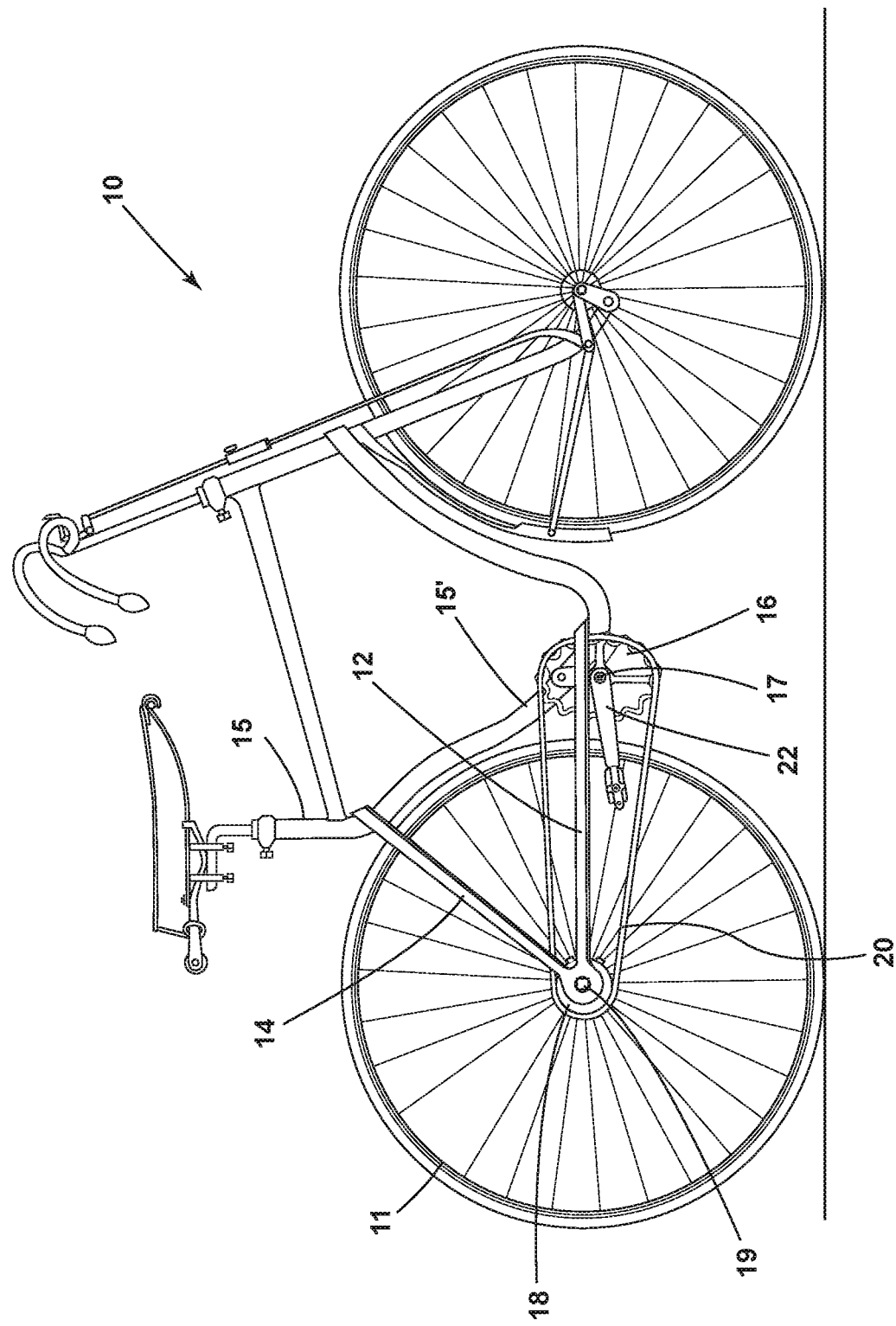
FIG. 6 (PRIOR ART) illustrates a side view of a prior art bicycle, in order to illustrate a standard "triple-triangle" bicycle structure and to show the drawbacks and challenges inherent in attempting to use a continuous belt assembly on the drive train of a standard triple-triangle structure bicycle.

The helical belt assembly disclosed by this application may be used in a wide variety of machines that depend upon a belt drive system and in which there is a need to use a continuous, unending, flexible drive belt that must be mounted to two or more sprockets where at least one of the sprockets is located outside of a structural constraint and another sprocket is located within the boundaries of the structural constraint. The helical belt assembly has specific applicability with regard to a standard bicycle having a triple triangle frame in which the seat tube, seat stay, and a chain stay form a solid triangular structure within which a rear sprocket is situated. This is true because the triangular structure of the rigidly connected seat tube, seat stay, and chain stay of a bicycle having a triple triangle frame operate as a structural restraint that prevents a prior art drive belt from being mounted onto the bicycle in order to connect the chain stay and the rear sprocket. FIG. 6 shows an older version of a bicycle 10 that helps to illustrate the problem inherent in trying to mount a continuous, endless drive belt of the prior art onto a bicycle having a triple triangle frame, why the prior art solutions to that problem are themselves problems, and how the helical belt assembly solves the problems.

As shown in FIG. 6, the standard bicycle 10 has a seat tube 15 that is rigidly connected to a forked seat stay 14 that descends downwardly at an angle away from the seat tube 15 to distal ends. The distal ends of the forked seat stay 14 are each rigidly connected to chain stays 12 that extend forward from the distal ends of the seat stay 14 to a bracket position 17 where the chain stays 12 are rigidly affixed to the bottom of the seat tube 15. On both sides of a bicycle 10 having a triple triangle frame, the support portion 15' of seat tube 15, the seat stay 14, and one of the chain stays 12 form a rigid triangular structure. The bicycle 10 further includes a chain ring 16 (which is a type of sprocket) that is rotationally mounted on the outside of one of the chain stays 12 at the bracket position 17. The bicycle 10 features pedals 22 that are rigidly affixed at their rotational axis to the chain ring 16 such that the chain ring 16 may be rotated by a cyclist pedaling using the pedals 22 in a manner that is well understood. The bicycle 10 also includes a rear wheel 11 that is rigidly affixed at its rotational axis to a rear sprocket 18. The rear wheel 11 and the rear sprocket 18 form a rotatable subassembly that is rotationally mounted between the distal ends of the forked seat stay 14 by a mechanical fastener, such as a nut 19.

In a conventional bicycle having a triple triangle frame, a drive chain 20 that is comprised of a multiplicity of metal links can be separated and later reconnected in order to connect the chain ring 16 to the rear sprocket 18 such that the links of the drive chain 20 are engaged by the teeth of the chain ring 16 and the teeth of the rear sprocket 18 as the cyclist uses pedals 22 to apply torque to the chain ring 16 that is transmitted to the rear sprocket 18 by the reconnected drive chain 20. This is all accomplished in a well understood manner. However, there are many advantages to using a flexible, continuous, unending drive belt in a drive belt system for bicycles rather than using a metal drive chain 20. As a result, many cyclists would prefer to use such a belt drive system of the type described in the patents to Lumpkin and Cody, if possible, with a standard bicycle having a triple triangle frame.

It can be understood from examining FIG. 6 why there are problems with using an endless, continuous, flexible drive belt of the type described by the patents to Lumpkin and Cody to connect the chain ring 16 with the rear sprocket 18 of a standard bicycle having a triple triangle frame. The seat tube 15, seat stay 14, and a chain stay 12 form a solid triangular structure within which the rear sprocket 18 is located, but the chain ring 16 is located at the bracket position 17 outside of that solid triangular structure. To connect the chain ring 16 with the rear sprocket 18, a drive belt must pass into the space that is bounded by the triangular structure, be mounted to the rear sprocket 18 in that space, and then passed back around the outer perimeter of the triangular structure in order to be mounted to the chain ring 16 because the triangular structure acts as a structural constraint without an opening in its perimeter. The difficulty that is encountered in attempting to mount the prior art drive belt onto a bicycle with a triple triangle frame lies in the fact that the prior art drive belt is designed to remain endless and continuous and it is not designed to be broken, separated or cut so as to form a belt with two separate ends in which one end could be threaded into the space bounded by the triangular structure for mounting to the rear sprocket 18. The prior art drive belt is made from rubber, polymeric, or composite materials and it is designed to remain whole such that any mechanical separation of the drive belt, such as by introducing an intentional lateral cut through the drive belt, would negatively impact the integrity and compromise the strength and durability of the drive belt even if a reconnection of the ends of the cut drive belt is later attempted. Thus, the prior art solution of cutting the drive belt to mount it to a bicycle having a triple triangle frame is not advisable.

Similarly, another prior art solution is to make a long v-shaped splice cut in the drive belt, which mates with a long pennant-shaped splice cut in the drive belt. The splice is then adhered, pinned or stitched back together. This prior art solution is offer as an alternative to a straight lateral cut of the belt, but it suffers from many of the same issues of the lateral cut approach, and also suffers from the issues with shear forces discussed above, in those sub-embodiments using pins to mend the v-shaped splice.

The alternative prior art solution to mounting a prior art drive belt onto a bicycle having a triple triangle frame is equally undesirable. That possible solution involves cutting a physical opening through the seat tube 15, the seat stay 14, or the chain stay 12 in order to be able to pass the body of the drive belt through the physical opening created in the triangular structure so that the drive belt can be mounted onto the rear sprocket 18 of the bicycle 10. However, the seat tube 15, seat stay 14, and chain stay 12 are designed to be rigidly affixed to each other as part of the triple triangle bicycle frame, and cutting a physical opening through the triangular structure degrades the strength and durability of the bicycle 10. Even if a physical opening is cut in one of these three structural members in order to mount the prior art drive belt to the rear sprocket 18 and subsequently the physical opening is closed by welding or otherwise adhering the separate pieces of the structural member back together, the joint created in that structural member of a bicycle with a triple triangle frame will remain a weak spot where the bicycle frame may later fail under extreme or even regular use conditions and may potentially cause catastrophic injury to a cyclist.

As can be readily appreciated, the helical belt assembly 100 is superior to the prior art belt drive 30 for use with a bicycle 10 having a triple triangle frame because the helical belt assembly 100 can be mounted onto the bicycle 100 in order to connect the chain ring 16 and the rear sprocket 18 without the need of cutting a physical opening through any of the structural members, including the seat tube 15, seat stay 14, or chain stay 12, and without the need of cutting or mechanically separating a drive belt 30. The helical belt assembly 100 hereby disclosed avoids the problems inherent in the prior art solutions for mounting prior art drive belts, such as those described in the patents to Lumpkin and Cody, onto bicycles with triple triangle frames and allows for the connection of the chain ring 16 and the rear sprocket 18 using the helical belt assembly 100 that will serve as a continuous, unending drive belt for the bicycle following its assembly on the bicycle as described with regard to FIGS. 3-5 above.

As explained herein, a number of different transverse compression devices may be used to create the transverse compressive force on the wrapped helical belt when assembled. Different transverse compression devices may be used depending upon the particular amount of compression needed for the belt application, the clearance of the belt with respect to surrounding structures, the desired assembly time, the need to remove the compression devices for adjustments or repairs, the available tools and the anticipated skill level of the user that is assembling the helical belt. As will be appreciated, many different fasteners, clips and/or bindings could serve to provide the required transverse compression necessary. Thus, while a number of different embodiments of transverse compression devices are described herein, these descriptions should not be understood to limit the scope of the present disclosure or any equivalents thereof.

Figure 7:
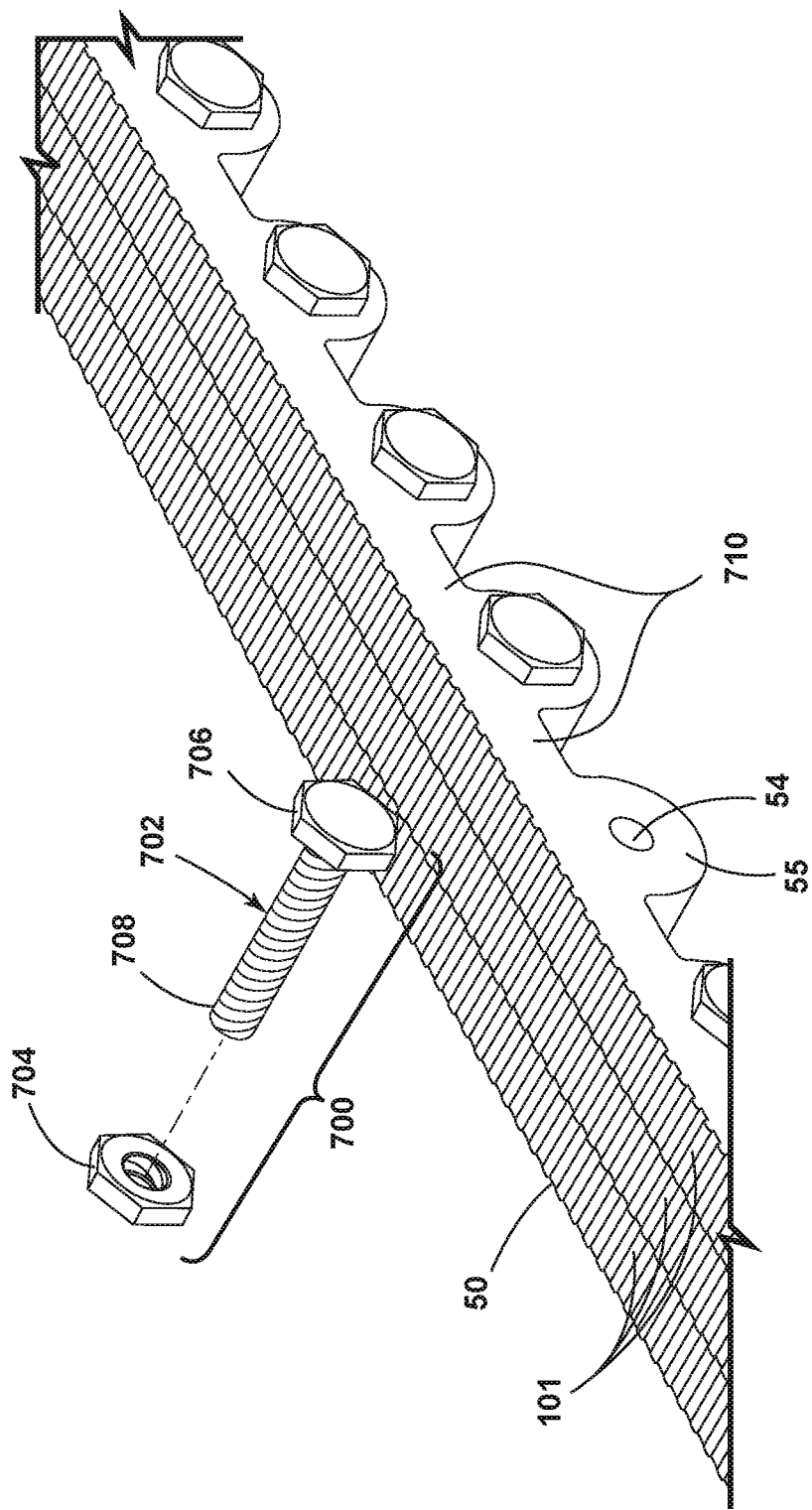
FIG. 7 is a close-up, perspective, front side, assembly drawing illustrating a threaded bolt embodiment of the transverse compression device.

With reference to FIGS. 7-9, one embodiment of a transverse compression device 700 is illustrated. Specifically, the combination of a threaded bolt 702 and a internally threaded nut 704 serve as the transverse compression device. The externally threaded bolt 702 has a head 706 and a shaft 708. The shaft 708 is threaded and is of a maximum diameter sufficient to pass through the through holes 54 of the belt teeth 55. The internally threaded nut 704 has an internal diameter sufficient to engage the threads of the externally threaded bolt 702. When the internally threaded nut 704 is engaged to the externally threaded bolt 702, the nut 704 and the head 706 create the compressive force upon the loops 101 of the flexible helical belt 50. The externally threaded bolt 702 may have any suitable shaped head 706 for the application, such as a hexagonal head, a rounded head, an Allen key head, etc., so long as it is able to engage the edge 710 of the helical belt 50 and provide adequate transverse compressive force. Further, preferably, most embodiments of the transverse compressive device disclosed herein, including the externally threaded bolt and nut combination, are not permanently affixed and are removable to enable adjustment, repair and replacement of the helical belt. That said, a permanently affixed transverse compression device can be used or created, by applying a threadlocking adhesive, such as "Loctite," to the parts of the transverse compressive device prior to securing it. Preferably, each embodiment of the transverse compressive device, including the externally threaded bolt and nut combination, avoids cutting into or otherwise damaging the flexible helical belt.

Figure 10:
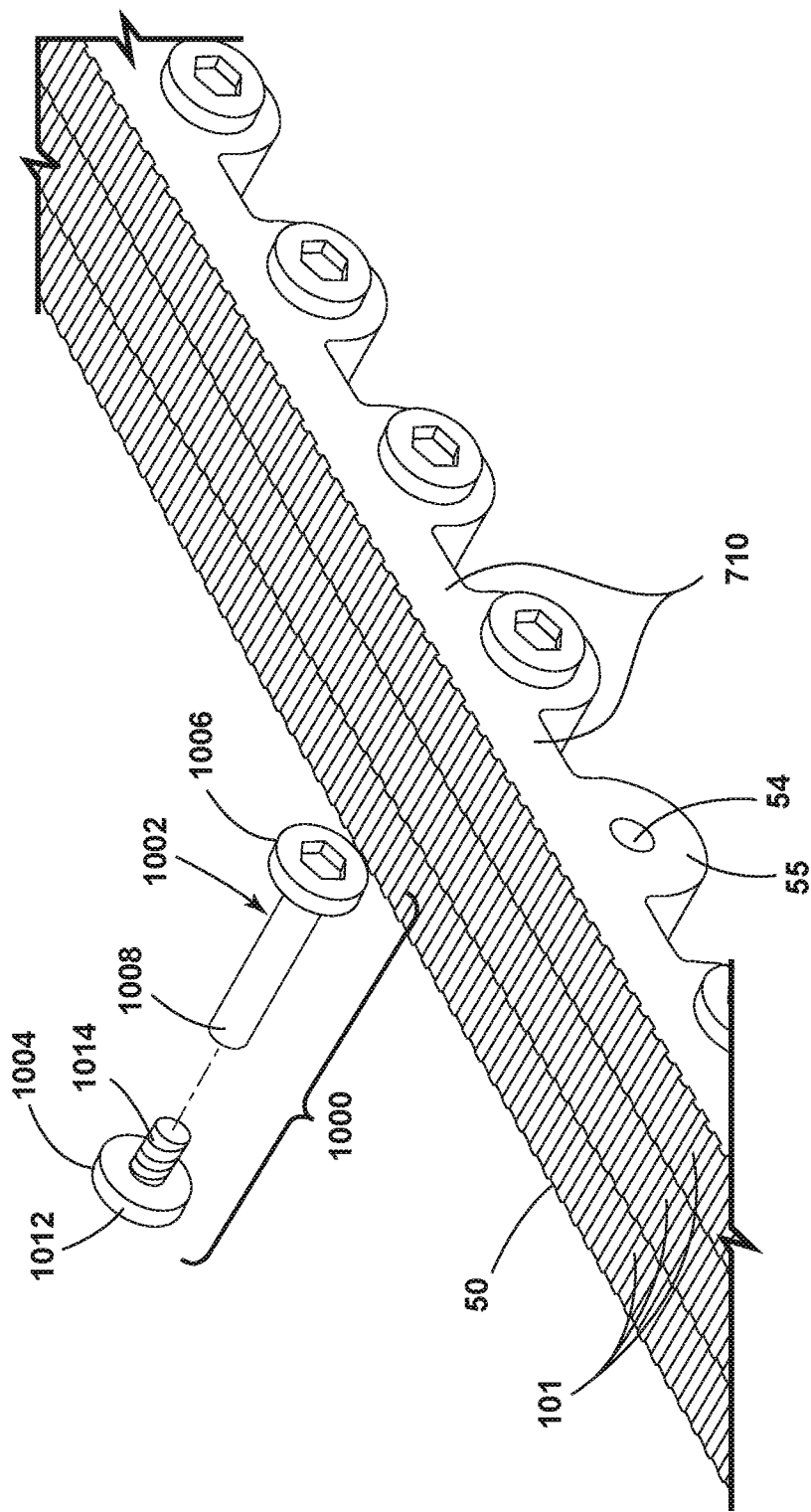
FIG. 10 is a close-up, perspective, front side, assembly drawing illustrating a smooth sleeve pin embodiment of the transverse compression device.

With reference to FIGS. 10-12, a second embodiment of a transverse compression device 1000 is illustrated. Specifically, the combination of a smooth sleeve pin 1002 and an accompanying threaded securing bolt 1004 serve as the transverse compression device.

The smooth sleeve pin 1002 has a pin head 1006 and a shaft 1008. The shaft 1008 has a smooth exterior sleeve which is of a diameter sufficient to pass through the through holes 54. The smooth exterior sleeve also has an interior longitudinal channel 1010, which may be threaded or smooth (not shown) and made of a material that will deform or cut when engaged by a cutting thread. The securing bolt 1004 has a bolt head 1012 and an exterior threaded shaft 1014 of sufficient diameter such that the exterior threaded shaft 1014 of the securing bolt 1012 can threadably engage the interior longitudinal channel 1010 of the smooth exterior sleeve of the pin 1002. Thus, when the securing bolt 1004 exterior threaded shaft 1014 is engaged with the interior longitudinal channel 1010, the bolt head 1012 and the pin head 1006 create the transverse compressive force on the multiple loops 101 of the flexible helical belt 50. In some embodiments, the exterior threaded shaft of the securing bolt is further secured to the interior longitudinal channel by a threadlocking adhesive. In other embodiments, the threads of the securing bolt 1014 cut into the sides of the longitudinal interior channel 1010. The pin head 1006 may be any suitable shaped head for the application, such as a hexagonal head, a rounded head, an Allen key head, etc., so long as it is able to engage the edge 710 of the helical belt 50 and provide adequate transverse compressive force.

Figure 13:
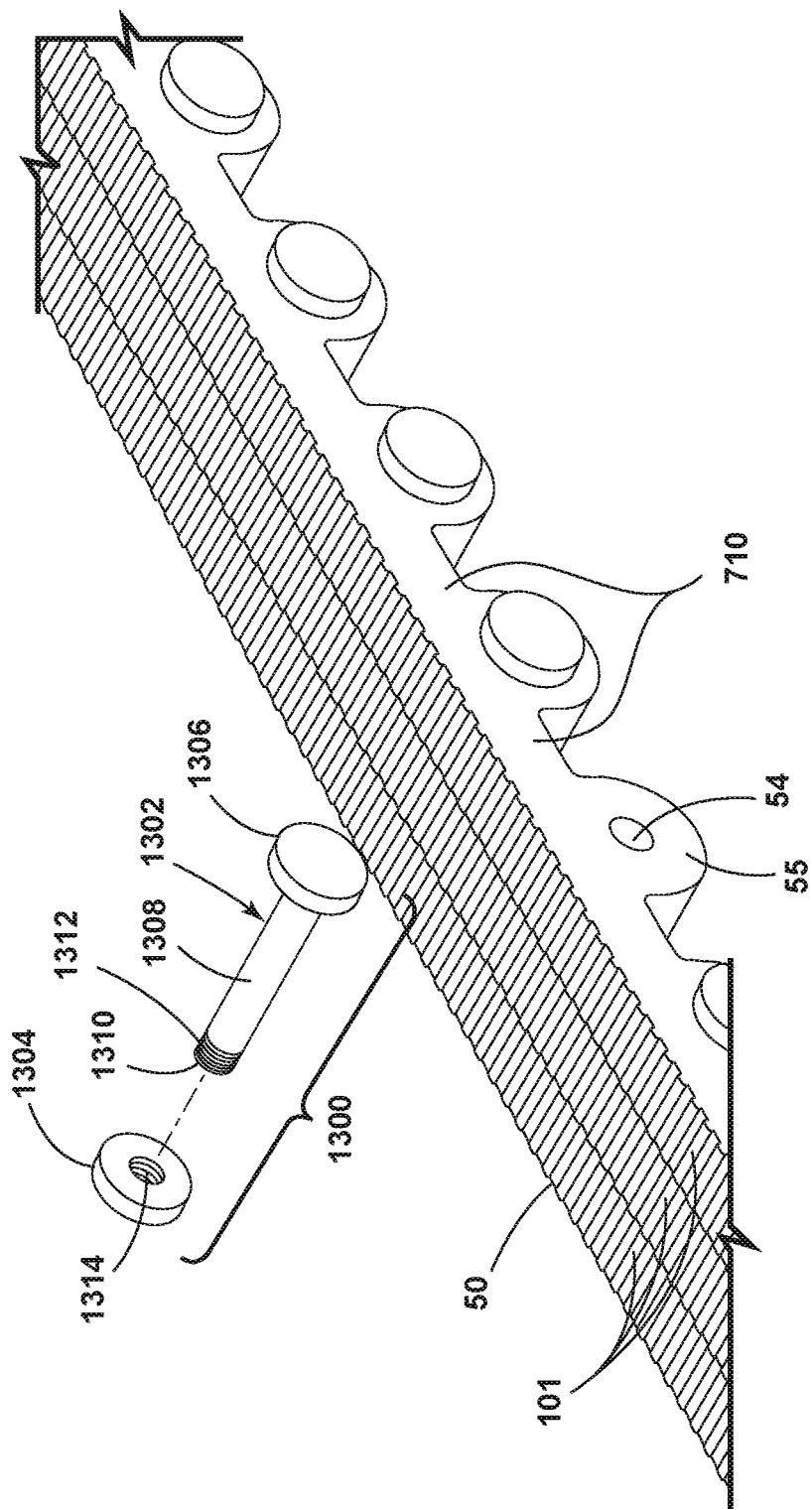
FIG. 13 is a close-up, perspective, front side, assembly drawing illustrating a headed barbed pin embodiment of the transverse compression device.
Figure 14:
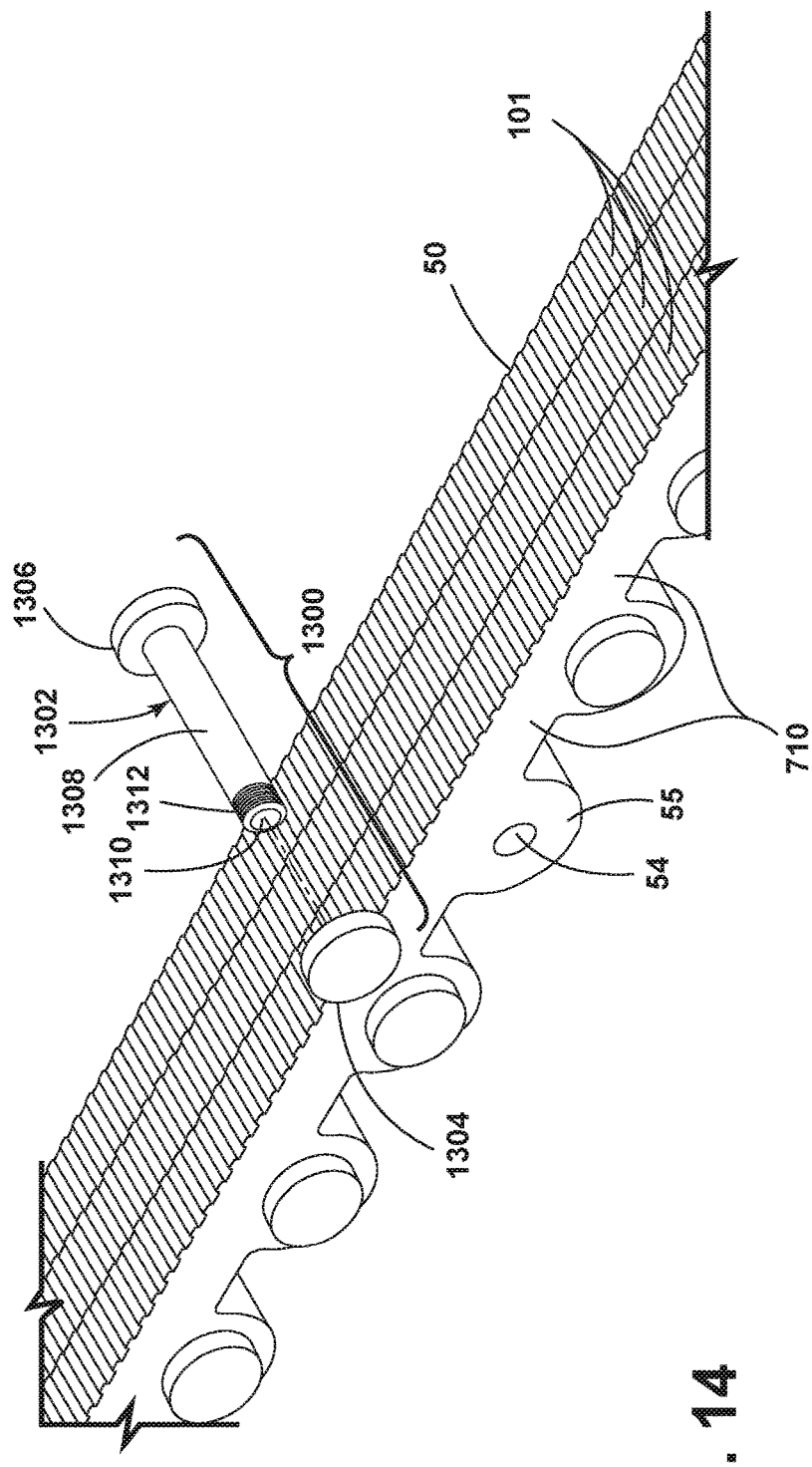
FIG. 14 is a close-up, perspective, back side, assembly drawing illustrating the headed barbed pin embodiment of the transverse compression device of FIG. 13.
Figure 15:
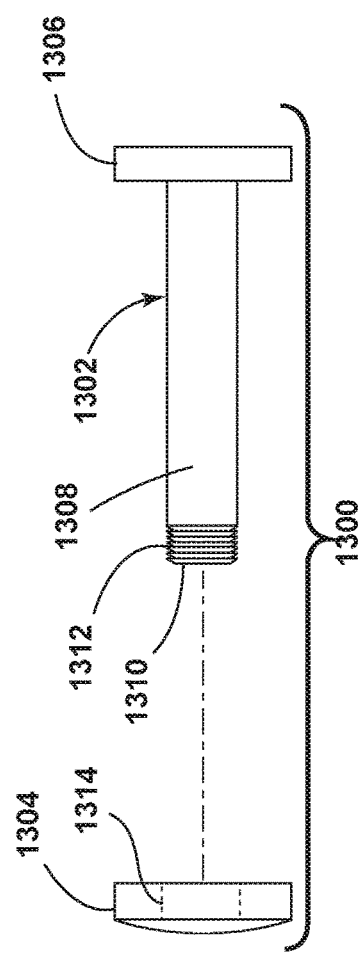
FIG. 15 is a close-up side view assembly drawing illustrating the headed barbed pin and accompanying cap nut of FIG. 13.

With reference to FIGS. 13-15, a third embodiment of a transverse compression device 1300 is illustrated. Specifically, the combination of a headed barbed pin 1302 and an accompanying cap nut 1304 serve as the transverse compression device. The headed barbed pin 1302 has a head 1306 and a shaft 1308. The distal end 1310 of the shaft 1308 has at least one barb. The barb may have a variety of different configurations. For example, as shown in FIGS. 13-15, the barb may be one or more non-threaded annular asymmetric lands 1312 and optionally corresponding grooves. The barb may also be a more exaggerated fishhook or latch type design, so long as it is able to engage with a cap nut 1304 or other securing component to create the necessary amount of transverse compressive force on the helical belt 50. The cap nut 1304 has a plurality of internal non-threaded annular lands and grooves 1314 configured for engaging with the at least one barb 1312 of the headed barbed pin 1302, so as to snap the cap nut 1304 onto the distal end 1310 of the headed barbed pin 1302. When engaged, the cap nut 1304 and the head 1306 create the transverse compressive force. In the embodiment shown, the shaft 1308 and the at least one barb 1312 are of diameter and length that when engaged in a through hole 54 to compress the loops 101 of the flexible helical belt 50 in a transverse direction, the at least one barb 1312 does not cut or otherwise put pressure on the flexible helical belt 50 in the longitudinal direction of the length of the flexible helical belt 50. The headed barbed pin 1302 may be made of metal or plastic. For example, as used herein, the term "plastic" means nylon, polyethylene terephthalate ("PET"), polypropylene, polyvinyl chloride ("PVC"), a composite thereof, or any other moderately stiff plastic. Further, the headed barbed pin 1302 may be made of a composite such as carbon fiber.

Further, while not illustrated, the transverse compressive device could be configured as a bolt or large pin, with an internal spring bias, which is held in place by a cotter pin in substitute for the nuts described herein.

Figure 16:
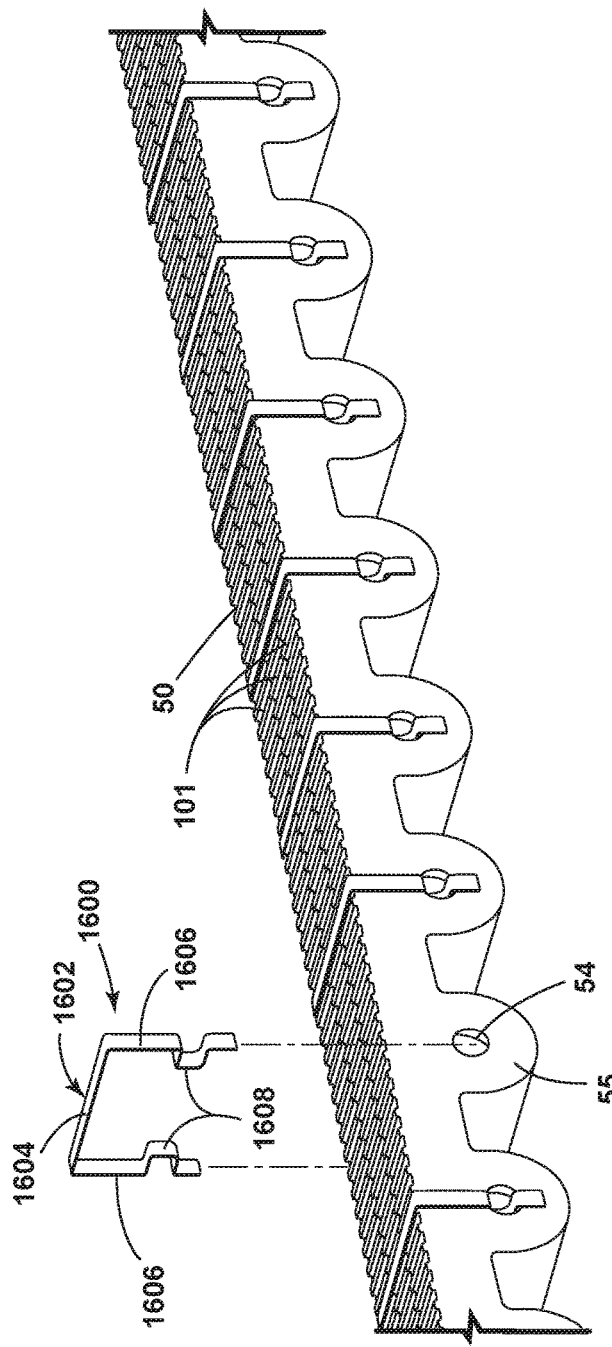
FIG. 16 is a close-up, perspective, front side, assembly drawing illustrating a staple clip embodiment of the transverse compression device.
Figure 17:
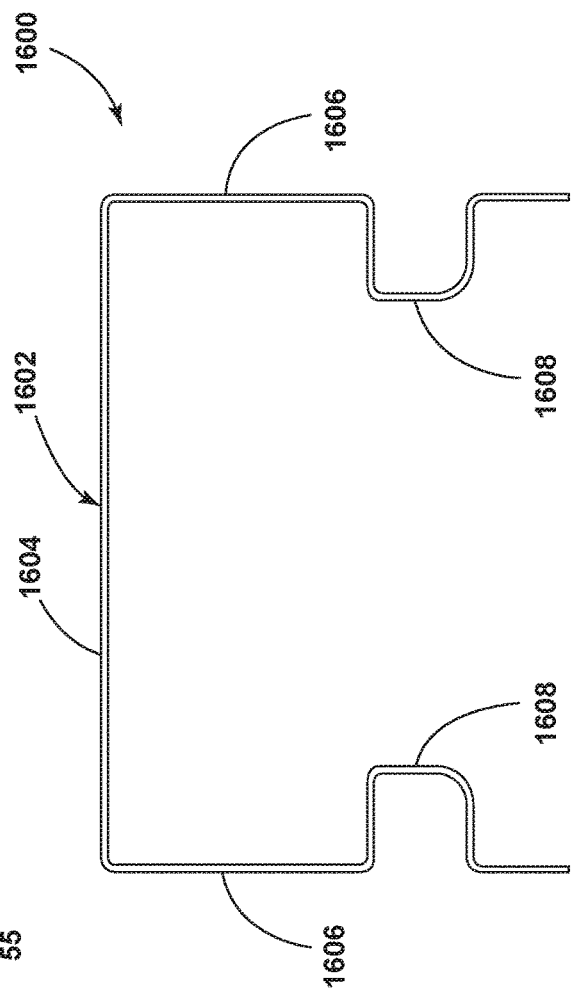
FIG. 17 is a close-up side view assembly drawing illustrating the headed barbed pin and accompanying cap nut of FIG. 16.

With reference to FIGS. 16-17, a fourth embodiment of a transverse compression device 1600 is illustrated. Specifically, a staple clip 1602 serves as the transverse compression device. The staple clip 1602 has a transverse arm 1604 from which extends, on either side of the transverse arm 1604, a compression arm 1606. Each of the opposed compression arms 1606 is biased inwardly, toward the opposite compression arm. Further, each of the compression arms 1606 has an opposed detent 1608 configured to engage with a through hole 54, such that when the clip 1602 is engaged with the aligned through holes, each opposed detent 1608 is engaged to a through hole 54 on one side of the flexible helical belt 50 and the opposed compression arms 1606 deliver the transverse compressive force to the flexible helical belt 50 via the opposed detents 1608 engaged at the aligned through holes 54.

In a further alternative embodiment of the staple clip transverse compression device, it will be understood that other clip-type designs may be employed. For example, a clip which provides compression via a tightening screw that pulls the compression arms inwardly, (rather than a pre-stressed bias in the compression arms) may be used.

In an alternative embodiment of helical belt 50 intended for use with the staple clip transverse compression device, the helical belt 50 may have a plurality of belt tooth indentations (not shown) in substitution for the through holes 54 of the other embodiments. Each belt tooth indentation must be sufficiently deep that it can engage with the detents 1608 of the compression arms 1606.

Figure 18:
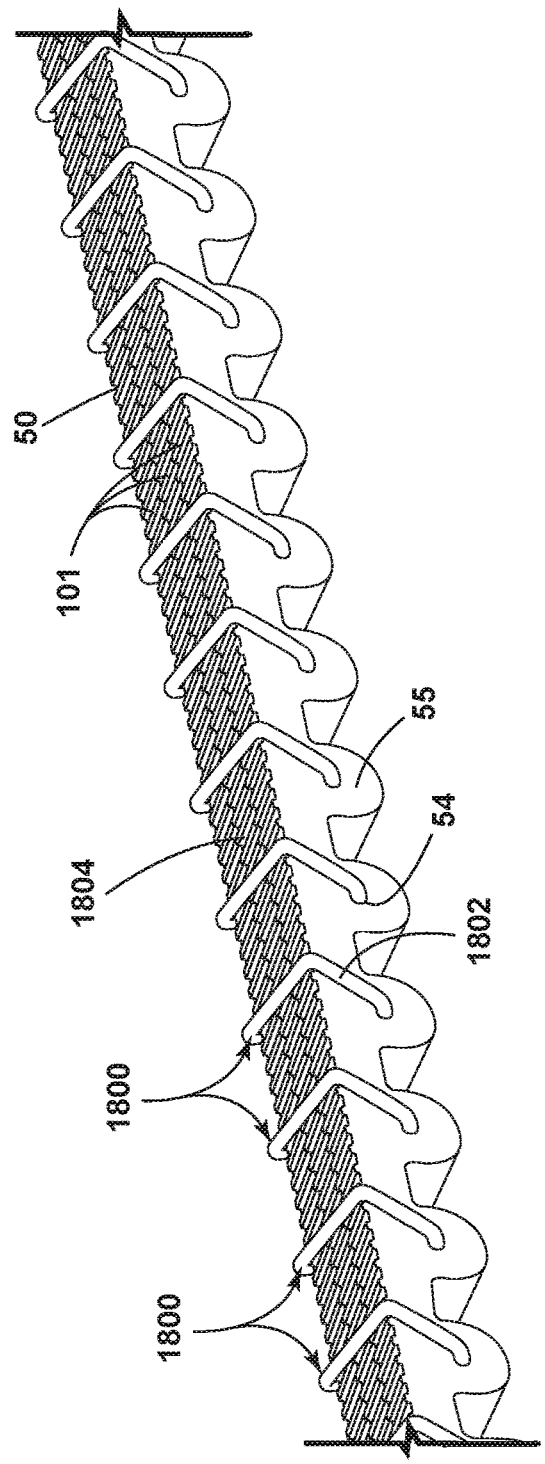
FIG. 18 is a close-up, perspective, front side, assembly drawing illustrating a lacing solution of the transverse compression device in which the lace wraps around the second planar surface of the assembled helical belt.
Figure 19:
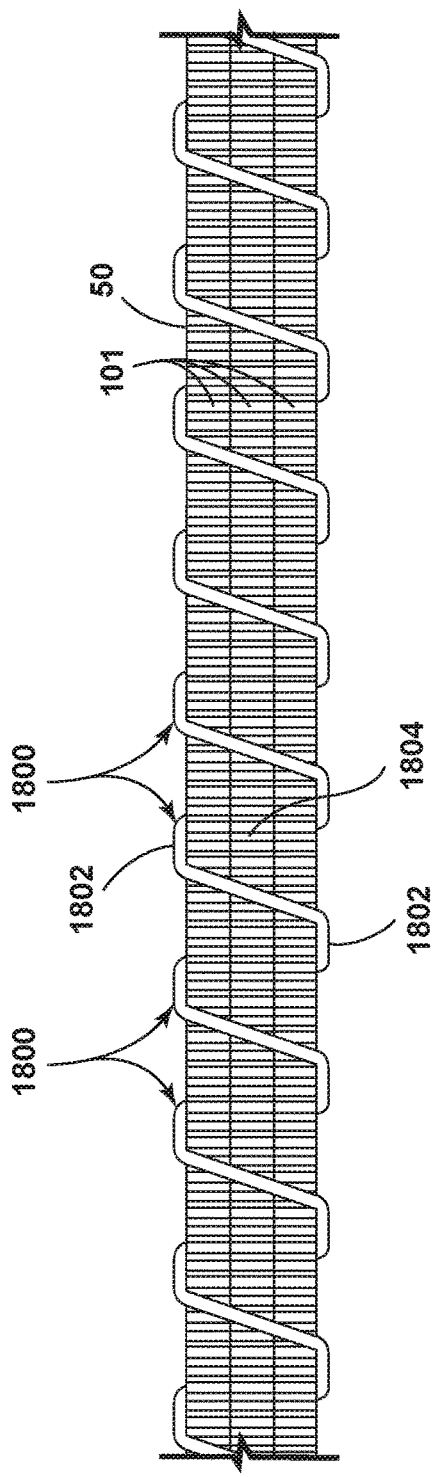
FIG. 19 is a close-up, top, assembly drawing illustrating the lace lacing solution of the transverse compression device of FIG. 18.

With reference to FIGS. 18-19, a fifth embodiment of a transverse compression device 1800 is illustrated. Specifically, a lacing solution serves as the transverse compression device. In this lacing solution embodiment, a lace 1802 wraps around the second planar surface 1804 of the assembled helical belt 50 and through adjacent through holes 54. The lace 1802 is laced through aligned through holes 54 and further wrapped around the exterior second planar side 1804 of the flexible helical belt 50, and then further laced through an adjacent set of aligned though holes 54. When the lace 1802 is tightened, it delivers the transverse compressive force to the flexible helical belt 50. The lace 1802 may be made of a variety of different materials, sufficient to deliver the necessary transverse compressive force and be durable in the given belt application. For example, the lace may be Kevlar, metal wire, nylon cord, carbon fiber, a flexible metal link, a nano-tube or some other tension cord.

Figure 20:
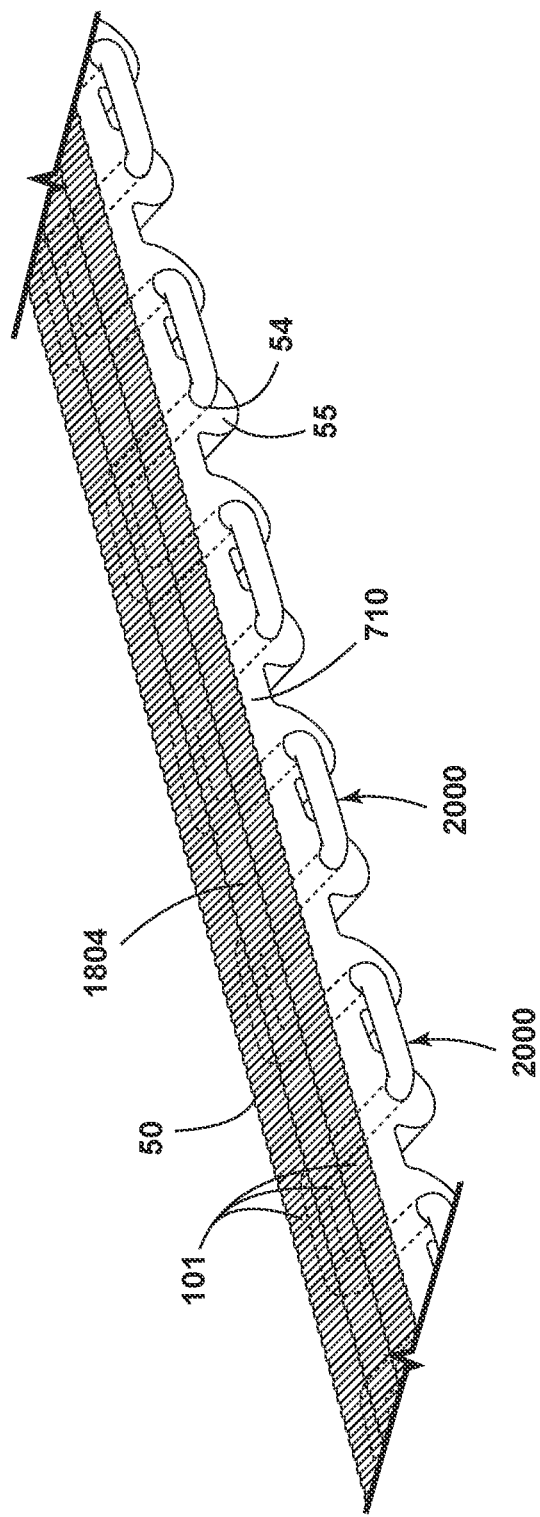
FIG. 20 is a perspective, front side, assembly drawing illustrating a lacing solution of the transverse compression device in which the lace does not wrap around the second planar surface of the assembled helical belt, but instead wraps across the outside of each side of the assembled helical belt.
Figure 21:
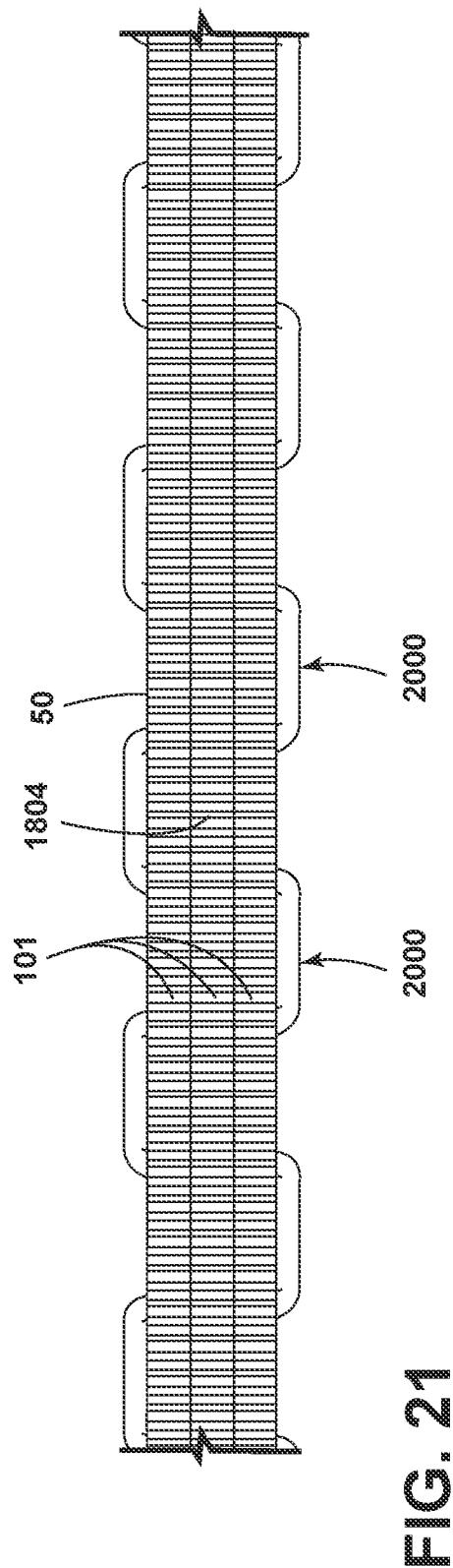
FIG. 21 is a close-up, top, assembly drawing illustrating the lace lacing solution of the transverse compression device of FIG. 20.

With reference to FIGS. 20-21 a sixth embodiment of a transverse compression device 2000, specifically a second lacing solution 2000 serves as the transverse compression device. In this second lacing solution embodiment, the lace 2000 does not wrap around the second planar surface 1804 of the assembled helical belt 50, but instead wraps across the edge 710 of each side of the assembled helical belt 50.

Figure 22:
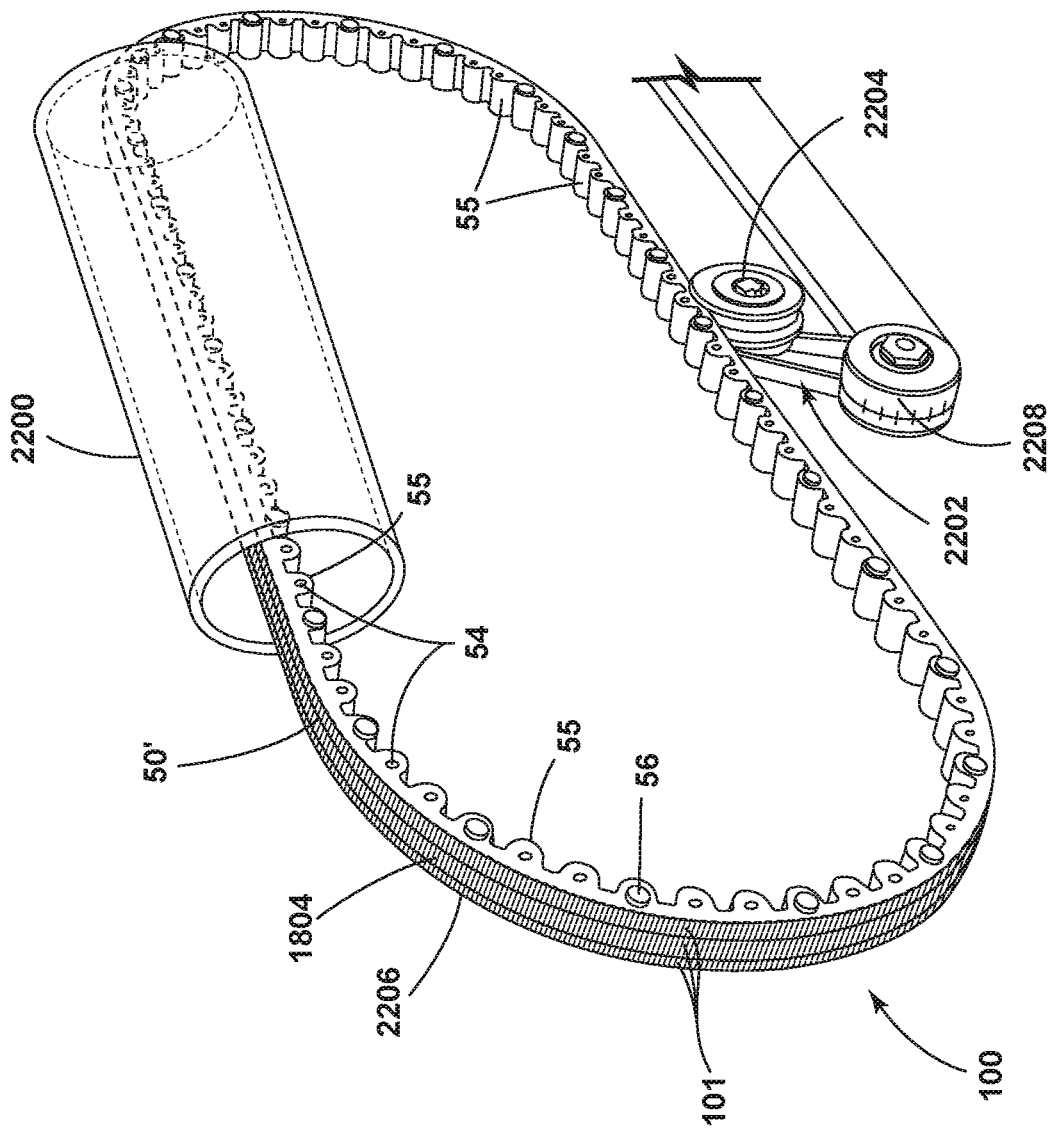
FIG. 22 is a perspective, front side drawing illustrating an embodiment of the assembled flexible helical belt described herein, in use in a confined tube situation, with a traveler/belt tensioner applying tension to the belt.

With reference to FIG. 22, an additional "confined tube" usage of the belt disclosed herein is illustrated. Also illustrated is a belt tensioner 2202, used to apply a constant tension to the belt as it travels its path. The belt tensioner illustrated is exemplary only, but can include a cog 2004 that engages the lands and grooves 2206 on the second planar surface 1804 of the assembled belt 50. The cog 2204 is rotationally movable about an axle, and is upwardly biased by one or more springs, which as shown are internal to a spring casing 2208, but is otherwise held in a fixed position with respect to the assembled belt 50. The assembled belt 50 passes through a confining tube 2200 in operation, which would prevent use of a conventional continuous single piece drive belt, as discussed above with respect to FIGS. 1-2.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments disclosed.

What is claimed is:

1. An assembled helical belt that is mounted within a mounting space defined by a continuous mechanical constraint of a device wherein the assembled helical belt is comprised of:
   a flexible helical belt having two distinct ends that is further comprised of a plurality of belt teeth affixed on a first planar surface of the flexible helical belt;
   wherein at least a subset of the plurality of belt teeth of the flexible helical belt are each pierced by a through hole which extends through the respective belt tooth;
   wherein the flexible helical belt is of sufficient length such that, when the flexible helical belt is mounted within the intended mounting space, the flexible helical belt overlaps itself by at least one rotation such that each through hole is transversely aligned with at least one other through hole;

the assembled helical belt having a width defined at a width position where the flexible helical belt overlaps itself by at least one rotation, wherein the width is measured transversely from a first outside edge of the assembled helical belt to a second outside edge of the assembled helical belt;

a plurality of transverse compression devices, each of which is engaged with one of the plurality of through holes of the plurality of belt teeth, and further engaged with the at least one transversely aligned through hole, wherein each respective transverse compression device creates a compressive force on the flexible helical belt along the width from the first outside edge to the second outside edge, in a direction that is generally transverse to the length of the flexible helical belt, to mechanically secure the assembled helical belt without melting or gluing a significant portion of the flexible helical belt, such that the assembled, compressed, flexible helical belt forms a single, continuous, unending drive belt that passes through the mounting space.

2. The assembled helical belt of claim 1 wherein at least one of the plurality of transverse compression devices comprises:

an externally threaded bolt with a head and further with a shaft of a maximum diameter sufficient to pass through each though hole;

an internally threaded nut of an internal diameter sufficient to engage threads of the externally threaded bolt; and wherein the internally threaded nut is engaged to the externally threaded bolt such that the nut and the head create the compressive force.

3. The assembled helical belt of claim 2 wherein the head of the externally threaded bolt further comprises a hexagonal head.

4. The assembled helical belt of claim 2 wherein the head of the externally threaded bolt further comprises an Allen key depression.

5. The assembled helical belt of claim 1 wherein at least one of the plurality of transverse compression devices comprises:

a pin comprising a pin head and a shaft, wherein the shaft comprises a smooth exterior sleeve of a diameter sufficient to pass through each though hole;

wherein the smooth exterior sleeve further comprises an interior longitudinal channel;

a securing bolt comprising a bolt head and an exterior threaded shaft of sufficient diameter such that the exterior threaded shaft of the securing bolt can threadably engage the interior longitudinal channel of the smooth exterior sleeve of the pin; and wherein the exterior threaded shaft of the securing bolt is engaged with the interior longitudinal channel such that the bolt head and the pin head create the compressive force.

6. The assembled helical belt of claim 5 wherein the exterior threaded shaft of the securing bolt is further secured to the interior longitudinal channel by a threadlocking adhesive.

7. The assembled helical belt of claim 5 wherein the pin head further comprises an Allen key depression.

8. The assembled helical belt of claim 1 wherein at least one of the plurality of transverse compression devices comprises:

a headed barbed pin comprising a head and a shaft, wherein a distal end of the shaft comprises at least one barb;

a cap nut comprising a nut with a plurality of internal non-threaded annular grooves configured for engaging with the at least one barb of the headed barbed pin, so as to snap the cap nut onto the distal end of the headed barbed pin; and wherein the cap nut is engaged to the at least one barb such that the cap nut and the head create the compressive force.

9. The assembled helical belt of claim 8 wherein the shaft and the at least one barb are of diameter and length that when engaged in each through hole to compress the flexible helical belt in a transverse direction, the at least one barb does not cut or otherwise put pressure on the flexible helical belt in a longitudinal direction of the length of the flexible helical belt.

10. The assembled helical belt of claim 8 wherein the headed barbed pin is comprised of metal.

11. The assembled helical belt of claim 8 wherein the headed barbed pin is comprised of plastic.

12. The assembled helical belt of claim 1 wherein at least one of the plurality of transverse compression devices comprises a staple clip comprising:

a clip having a transverse arm from which extends, on either side of the transverse arm, a compression arm, wherein each of the compression arms is biased inwardly, and further wherein each of the compression arms has an opposed detent configured to engage with a through hole, such that when the clip is engaged with the aligned through holes, each opposed detent is engaged to a through hole on one side of the flexible helical belt and the opposed compression arms deliver the compressive force to the flexible helical belt via the opposed detents engaged at the aligned through holes.

13. The assembled helical belt of claim 1 wherein at least one of the plurality of transverse compression devices comprises a lacing comprising:

a lace that is laced through each aligned though hole and further wrapped around an exterior planar side of the flexible helical belt, and then further laced through an adjacent set of aligned though holes;

wherein the lace is tightened such that the lace delivers the compressive force to the flexible helical belt.

14. The assembled helical belt of claim 13 wherein the lace is comprised of Kevlar.

15. The assembled helical belt of claim 1 wherein at least one of the plurality of transverse compression devices comprises a lacing comprising:

a lace that is laced through each aligned though hole and which is in contact with an outside edge of the flexible helical belt but not an exterior planar side of the flexible helical belt;

wherein the lace is tightened such that the lace delivers the compressive force to the flexible helical belt.

16. The assembled helical belt of claim 15 wherein the lace is comprised of Kevlar.

17. The assembled helical belt of claim 1 wherein there is a through hole in every other belt tooth of the plurality of belt teeth.

18. The assembled helical belt of claim 1 wherein there is a through hole in every third belt tooth of the plurality of belt teeth.

19. The assembled helical belt of claim 1 wherein the flexible helical belt further comprises at least one embedded strand of Kevlar fiber.

20. The assembled helical belt of claim 1 wherein the flexible helical belt further comprises at least one embedded strand of carbon fiber.

21. The assembled helical belt of claim 1 wherein the flexible helical belt further comprises at least one embedded strand of nylon fiber.

22. The assembled helical belt of claim 1 wherein the flexible helical belt further comprises at least one embedded strand of metal wire.

23. The assembled helical belt of claim 1 wherein the assembled helical belt is assembled without any melting or gluing of the flexible helical belt to itself.

24. The assembled helical belt of claim 1 wherein the flexible helical belt is assembled without any barbed couplings directly engaging the flexible helical belt.

25. The assembled helical belt of claim 1 wherein the flexible helical belt has a width, and wherein the assembled helical belt has the flexible helical belt looped upon itself such that at least three widths of the flexible helical belt are adjacent to one another for an entire length of the assembled helical belt.

26. The assembled helical belt of claim 1 wherein the flexible helical belt has a width of between 8 cm and 1000 cm.

27. The assembled helical belt of claim 1 wherein the plurality of transverse compression devices can be removed without damaging the flexible helical belt.

28. The assembled helical belt of claim 1 wherein the flexible helical belt has lands and grooves on a second planar surface of the flexible helical belt, for engagement with a belt tensioner.

29. A method for mounting a helical belt assembly within a mounting space defined by a continuous mechanical constraint of a device wherein the method comprises:
  selecting a flexible helical belt having two distinct ends that is further comprised of a plurality of belt teeth affixed on a first planar surface of the flexible helical belt and wherein a the plurality of the belt teeth of the flexible helical belt are each pierced by a through hole which extends through the respective belt tooth of the plurality of belt teeth and wherein the flexible helical belt is of sufficient length such that, when the flexible helical belt is mounted within the intended mounting space, the flexible helical belt overlaps itself by at least one rotation such that each through hole will be transversely aligned with at least one other through hole, and wherein the assembled helical belt has a width defined at a width position where the flexible helical belt overlaps itself by at least one rotation, wherein the width is measured transversely from a first outside edge of the assembled helical belt to a second outside edge of the assembled helical belt;
  selecting a plurality of transverse compression devices, each of which may be engaged with one of the plurality of through holes of the plurality of belt teeth, and further with the at least one transversely aligned through hole;
  engaging the plurality of transverse compression devices with the flexible helical belt, such that each respective transverse compression device, when engaged with the respective through hole and the respective transversely aligned through hole, creates a compressive force on the flexible helical belt along the width from the first outside edge to the second outside edge, in a direction that is generally transverse to the length of the flexible helical belt, to mechanically secure the helical belt assembly without melting or gluing a significant portion of the flexible helical belt, such that the compressed flexible helical belt forms a single, continuous, unending drive belt that passes through the mounting space.

30. The method for mounting a helical belt assembly of claim 29 wherein at least one of the plurality of transverse compression devices comprises:
  an externally threaded bolt with a head and further with a shaft of a maximum diameter sufficient to pass through each though hole;
  an internally threaded nut of an internal diameter sufficient to engage the engage threads of the externally threaded bolt; and
  wherein the internally threaded nut is engaged to the externally threaded bolt such that the internally threaded nut and the head create the compressive force.

31. The method for mounting a helical belt assembly of claim 30 wherein the head of the externally threaded bolt further comprises a hexagonal head.

32. The method for mounting a helical belt assembly of claim 30 wherein the head of the externally threaded bolt further comprises an Allen key depression.

33. The method for mounting a helical belt assembly of claim 29 wherein at least one of the plurality of transverse compression devices comprises:
  a pin comprising a pin head and a shaft, wherein the shaft comprises a smooth exterior sleeve of a diameter sufficient to pass through each though hole;
  wherein the smooth exterior sleeve further comprises an interior longitudinal channel;
  a securing bolt comprising a bolt head and an exterior threaded shaft of sufficient diameter such that the exterior threaded shaft of the securing bolt can threadably engage the interior longitudinal channel of the smooth exterior sleeve of the pin; and
  wherein the exterior threaded shaft of the securing bolt is engaged with the interior longitudinal channel such that the bolt head and the pin head create the compressive force.

34. The method for mounting a helical belt assembly of claim 33 wherein the exterior threaded shaft of the securing bolt is further secured to the interior longitudinal channel by a threadlocking adhesive.

35. The method for mounting a helical belt assembly of claim 33 wherein the pin head further comprises an Allen key depression.

36. The method for mounting a helical belt assembly of claim 29 wherein at least one of the plurality of transverse compression devices comprises:
  a headed barbed pin comprising a head and a shaft, wherein a distal end of the shaft comprises at least one barb;
  a cap nut comprising a nut with a plurality of internal non-threaded annular grooves configured for engaging with the at least one barb of the headed barbed pin, so as to snap the cap nut onto the distal end of the headed barbed pin; and
  wherein the cap nut is engaged to the at least one barb such that the cap nut and the head create the compressive force.

37. The method for mounting a helical belt assembly of claim 36 wherein the shaft and the at least one barb are of diameter and length that when engaged in each through hole to compress the flexible helical belt in a transverse direction, the at least one barb does not cut or otherwise put pressure on the flexible helical belt in a longitudinal direction of the length of the flexible helical belt.

38. The method for mounting a helical belt assembly of claim 36 wherein the headed barbed pin is comprised of metal.

39. The method for mounting a helical belt assembly of claim 36 wherein the headed barbed pin is comprised of plastic.

40. The method for mounting a helical belt assembly of claim 29 wherein at least one of the plurality of transverse compression devices comprises a staple clip comprising:
 a clip having a transverse arm from which extends, on either side of the transverse arm, a compression arm, wherein each of the compression arms is biased inwardly, and further wherein each of the compression arms has an opposed detent configured to engage with a through hole, such that when the clip is engaged with the aligned through holes, each opposed detent is engaged to a through hole on one side of the flexible helical belt and the opposed compression arms deliver the compressive force to the flexible helical belt via the opposed detents engaged at the aligned through holes.

41. The method for mounting a helical belt assembly of claim 29 wherein at least one of the plurality of transverse compression devices comprises a lacing comprising:
 a lace that is laced through each aligned though hole and further wrapped around an exterior planar side of the flexible helical belt, and then further laced through an adjacent set of aligned though holes;
 wherein the lace is tightened such that the lace applies the compressive force to the flexible helical belt.

42. The method for mounting a helical belt assembly of claim 41 wherein the lace is comprised of Kevlar.

43. The method for mounting a helical belt assembly of claim 29 wherein at least one of the plurality of transverse compression devices comprises a lacing comprising:
 a lace that is laced through each aligned though hole and which is in contact with an outside edge of the flexible helical belt but not an exterior planar side of the flexible helical belt;
 wherein the lace is tightened such that the lace applies the compressive force compressive force to the flexible helical belt.

44. The method for mounting a helical belt assembly of claim 43 wherein the lace is comprised of Kevlar.

45. The method for mounting a helical belt assembly of claim 29 wherein there is a through hole in every other belt tooth of the plurality of belt teeth.

46. The method for mounting a helical belt assembly of claim 29 wherein there is a through hole in every third belt tooth of the plurality of belt teeth.

47. The method for mounting a helical belt assembly of claim 29 wherein the flexible helical belt further comprised of at least one embedded strand of Kevlar fiber.

48. The method for mounting a helical belt assembly of claim 29 wherein the flexible helical belt is further comprised of at least one embedded strand of carbon fiber.

49. The method for mounting a helical belt assembly of claim 29 wherein the flexible helical belt is further comprised of at least one embedded strand of nylon fiber.

50. The method for mounting a helical belt assembly of claim 29 wherein the flexible helical belt is further comprised of at least one embedded strand of metal wire.

51. The method for mounting a helical belt assembly of claim 29 wherein the helical belt assembly is assembled without any melting or gluing of the flexible helical belt to itself.

52. The method for mounting a helical belt assembly of claim 29 wherein the helical belt assembly is assembled without any barbed couplings directly engaging the flexible helical belt.

53. The method for mounting a helical belt assembly of claim 29 wherein the flexible helical belt has a width, and wherein the assembled helical belt assembly has the flexible helical belt looped upon itself such that at least three widths of the flexible helical belt are adjacent to one another for an entire length of the assembled helical belt assembly.

54. The method for mounting a helical belt assembly of claim 29 wherein the flexible helical belt has a width of between 8 cm and 1000 cm.

55. The method for mounting a helical belt assembly of claim 29 wherein the plurality of transverse compression devices can be removed without damaging the flexible helical belt.

56. The method for mounting a helical belt assembly of claim 29 wherein the flexible helical belt has grooves on a second planar surface of the flexible helical belt, for engagement with a belt tensioner.

57. A kit for a helical belt assembly that may be mounted within a mounting space defined by a continuous mechanical constraint of a device wherein the kit for the helical belt assembly is comprised of:
 a flexible helical belt having two distinct ends that is further comprised of a plurality of belt teeth affixed on a first planar surface of the flexible helical belt;
 wherein a plurality of the belt teeth of the flexible helical belt are each pierced by a through hole which extends through the respective belt tooth of the plurality of belt teeth;
 wherein the flexible helical belt is of sufficient length such that, when the flexible helical belt is mounted within the intended mounting space, the flexible helical belt will overlap itself by at least one rotation such that each through hole will be transversely aligned with at least one other through hole;
 wherein, the helical belt assembly, when mounted, has a width defined at a width position where the flexible helical belt overlaps itself by at least one rotation, wherein the width is measured transversely from a first outside edge of the assembled helical belt to a second outside edge of the assembled helical belt;
 a plurality of transverse compression devices, each of which may be engaged with one of the plurality of through holes of the plurality of belt teeth, and further engaged with the at least one transversely aligned through hole, wherein each respective transverse compression device, when engaged with the respective through hole and the respective transversely aligned through hole, will create a compressive force on the flexible helical belt along the width from the first outside edge to the second outside edge, in a direction that is generally transverse to the length of the flexible helical belt, whereby the helical belt assembly may be mounted and mechanically secured without melting or gluing a significant portion of the flexible helical belt.

58. The kit for the helical belt assembly of claim 57 wherein at least one of the plurality of transverse compression devices comprises:
 an externally threaded bolt with a shaft of a maximum diameter sufficient to pass through each though hole; and
 an internally threaded nut of an internal diameter sufficient to engage threads of the externally threaded bolt.

59. The kit for the helical belt assembly of claim 58 wherein the externally threaded bolt further comprises a hexagonal head.

60. The kit for the helical belt assembly of claim 58 wherein the externally threaded bolt further comprises a head with an Allen key depression.

61. The kit for the helical belt assembly of claim 58 wherein at least one of the plurality of transverse compression devices comprises:
  a pin comprising a head and a shaft, wherein the shaft comprises a smooth exterior sleeve of a diameter sufficient to pass through each though hole;
  wherein the smooth exterior sleeve further comprises an interior longitudinal channel;
  a securing bolt comprising a head and an exterior threaded shaft of sufficient diameter such that the exterior threaded shaft of the securing bolt can threadably engage the interior longitudinal channel of the smooth exterior sleeve of the pin.

62. The kit for the helical belt assembly of claim 61 wherein the exterior threaded shaft of the securing bolt is further secured to the interior longitudinal channel by a threadlocking adhesive.

63. The kit for the helical belt assembly of claim 61 wherein the head of the pin further comprises an Allen key depression.

64. The kit for the helical belt assembly of claim 57 wherein at least one of the plurality of transverse compression devices comprises:
  a headed barbed pin comprising a head and a shaft, wherein a distal end of the shaft comprises at least one barb;
  a cap nut comprising a nut with a plurality of internal non-threaded annular grooves configured for engaging with the at least one barb of the headed barbed pin, so as to snap the cap nut onto the distal end of the headed barbed pin.

65. The kit for the helical belt assembly of claim 64 wherein the shaft and the at least one barb are of diameter and length that when engaged in each through hole to compress the flexible helical belt in a transverse direction, the at least one barb does not cut or otherwise put pressure on the flexible helical belt in a longitudinal direction of the length of the flexible helical belt.

66. The kit for the helical belt assembly of claim 64 wherein the headed barbed pin is comprised of metal.

67. The kit for the helical belt assembly of claim 64 wherein the headed barbed pin is comprised of plastic.

68. The kit for the helical belt assembly of claim 57 wherein at least one of the plurality of transverse compression devices comprises a staple clip comprising:
  a clip having a transverse arm from which extends, on either side of the transverse arm, a compression arm, wherein each of the compression arms is biased inwardly, and further wherein each of the opposed compression arms has an opposed detent configured to engage with a through hole, such that when the clip is engaged with the aligned through holes, each opposed detent is engaged to a through hole on one side of the flexible helical belt and the compression arm delivers the compressive force to the flexible helical belt via the opposed detents engaged at the aligned through holes.

69. The kit for the helical belt assembly of claim 57 wherein at least one of the plurality of transverse compression devices comprises a lacing comprising:
  a lace that is laced through each aligned though hole and further wrapped around an exterior planar side of the flexible helical belt, and then further laced through an adjacent set of aligned though holes;
  wherein the lace is tightened such that the lace applies the compressive force to the flexible helical belt.

70. The kit for the helical belt assembly of claim 69 wherein the lace is comprised of Kevlar.

71. The kit for the helical belt assembly of claim 57 wherein at least one of the plurality of transverse compression devices comprises a lacing comprising:
  a lace that is laced through each aligned though hole and which is in contact with an outside edge of the flexible helical belt but not an exterior planar side of the flexible helical belt;
  wherein the lace is tightened such that the lace applies the compressive force to the flexible helical belt.

72. The kit for the helical belt assembly of claim 71 wherein the lace is comprised of Kevlar.

73. The kit for the helical belt assembly of claim 57 wherein there is a through hole in every other belt tooth of the plurality of belt teeth.

74. The kit for the helical belt assembly of claim 57 wherein there is a through hole in every third belt tooth of the plurality of belt teeth.

75. The kit for the helical belt assembly of claim 57 wherein the flexible helical belt further comprised of at least one embedded strand of Kevlar fiber.

76. The kit for the helical belt assembly of claim 57 wherein the flexible helical belt is further comprised of at least one embedded strand of carbon fiber.

77. The kit for the helical belt assembly of claim 57 wherein the flexible helical belt is further comprised of at least one embedded strand of nylon fiber.

78. The kit for the helical belt assembly of claim 57 wherein the flexible helical belt is further comprised of at least one embedded strand of metal wire.

79. The kit for the helical belt assembly of claim 57 wherein the helical belt assembly is assembled without any melting or gluing of the flexible helical belt to itself.

80. The kit for the helical belt assembly of claim 57 wherein the helical belt assembly is assembled without any barbed couplings directly engaging the flexible helical belt.

81. The kit for the helical belt assembly of claim 57 wherein the flexible helical belt has a width, and wherein the assembled helical belt assembly has the flexible helical belt looped upon itself such that at least three widths of the flexible helical belt are adjacent to one another for an entire length of the assembled helical belt assembly.

82. The kit for the helical belt assembly of claim 57 wherein the flexible helical belt has a width of between 8 cm and 1000 cm.

83. The kit for the helical belt assembly of claim 57 wherein the plurality of transverse compression devices can be removed without damaging the flexible helical belt.

84. The kit for the helical belt assembly of claim 57 wherein the flexible helical belt has grooves on a second planar surface of the flexible helical belt, for engagement with a belt tensioner.

85. A method of mounting a helical belt assembly within a device having a mounting space defined by a continuous mechanical constraint wherein the method is comprised of:
  looping a flexible helical belt with two distinct ends through the mounting space of the device, such that a plurality of loops of the flexible helical belt are created through the mounting space;
  bringing the plurality of loops of the flexible helical belt into mating alignment with each other at the edges of the plurality of loops; and mechanically securing the plurality of loops of the flexible helical belt together without gluing, melting, or using a barbed coupling that has barbs that engage the flexible helical belt, so that the plurality of loops cooperate to form a single, continuous, unending drive belt that passes through the mounting space; wherein the helical belt assembly has width defined at a width position where the flexible helical belt overlaps itself by at least one rotation, wherein, the width is measured transversely from a first outside edge of the helical belt assembly to a second outside edge of the helical belt assembly; and wherein, the step of mechanically securing comprises using a plurality of mechanical securing devices, each of which passes through the flexible helical belt transversely along the width from the first outside edge to the second outside edge of the helical belt assembly.

* * * * *